July 4, 1950

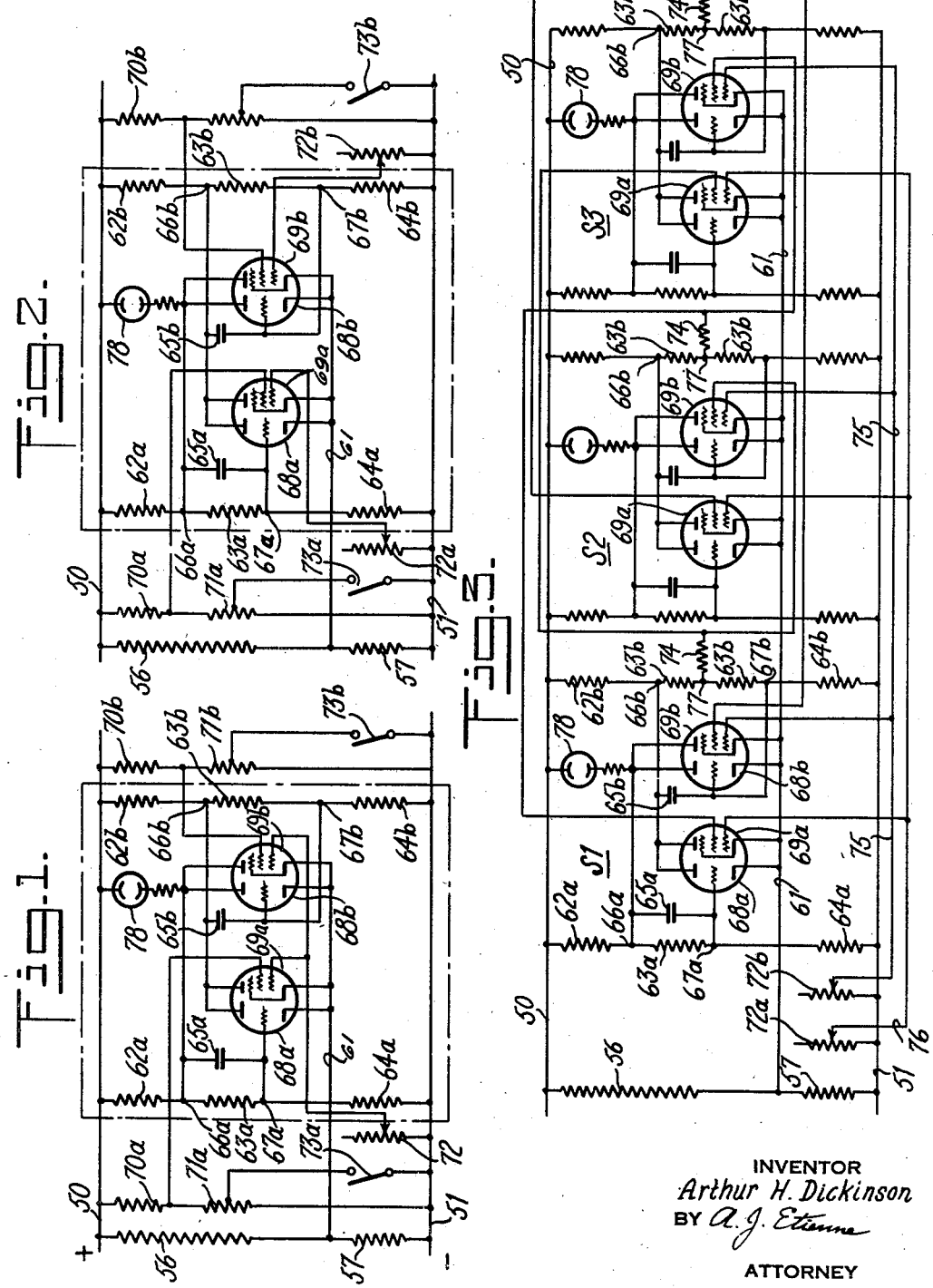

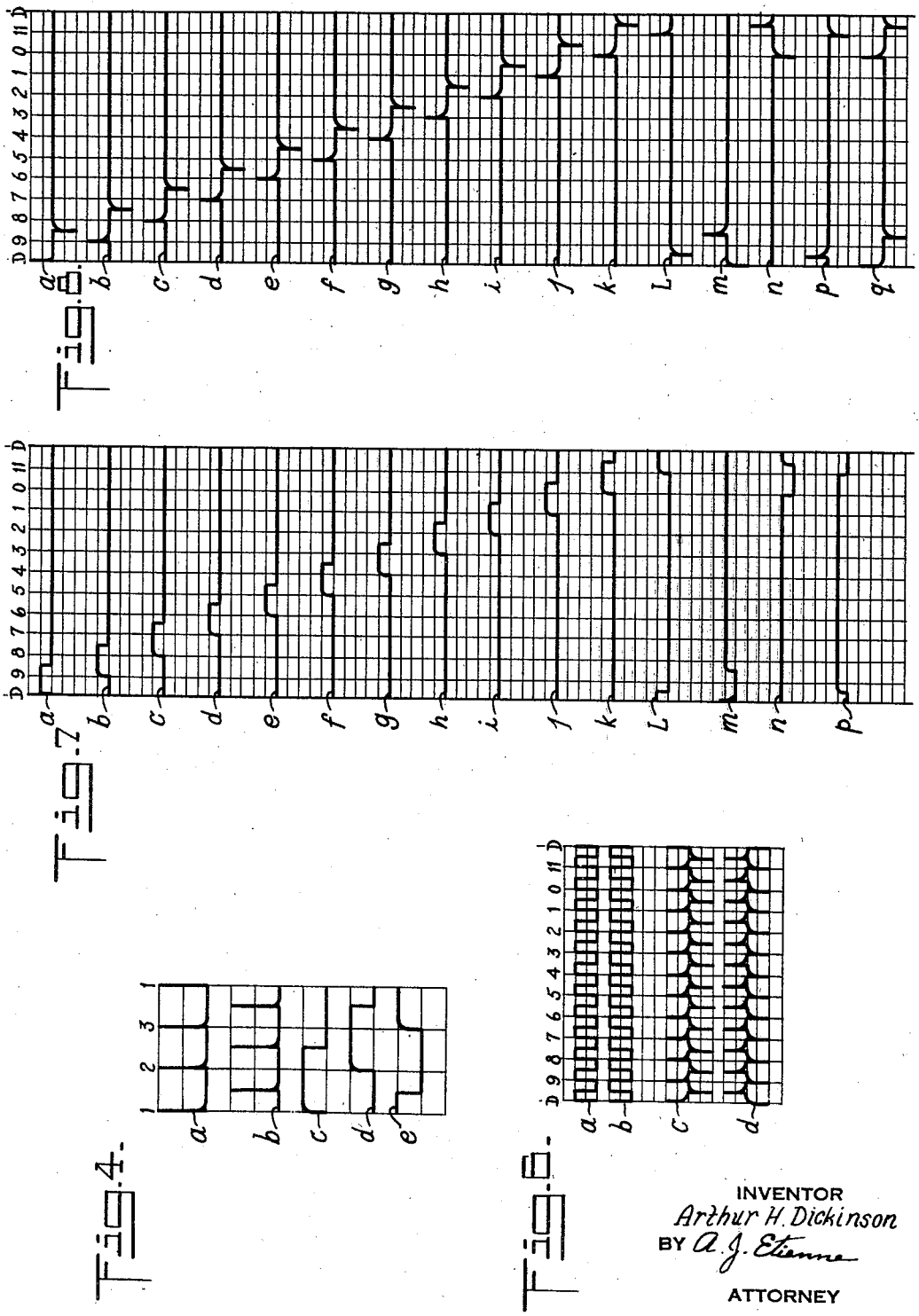

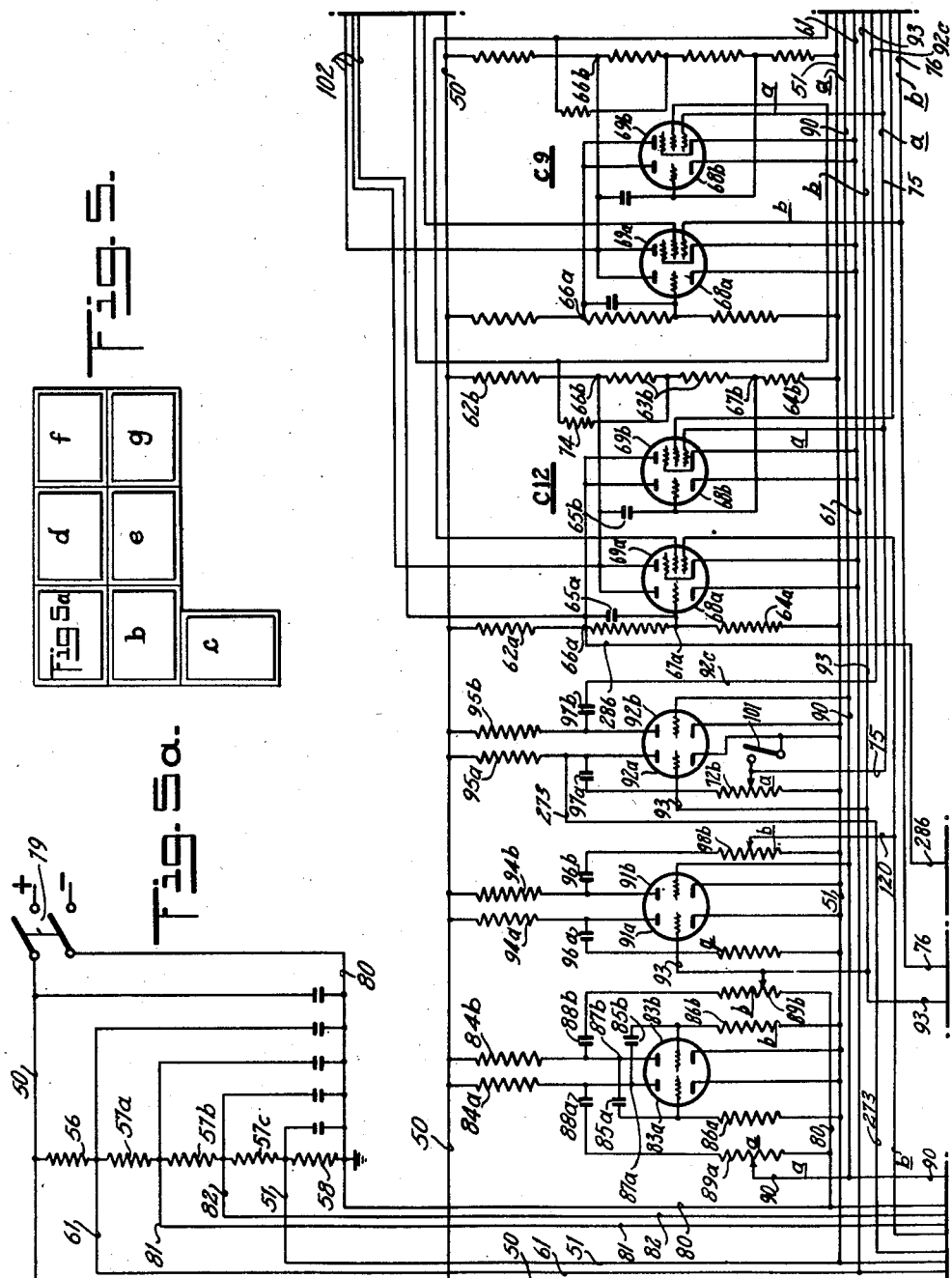

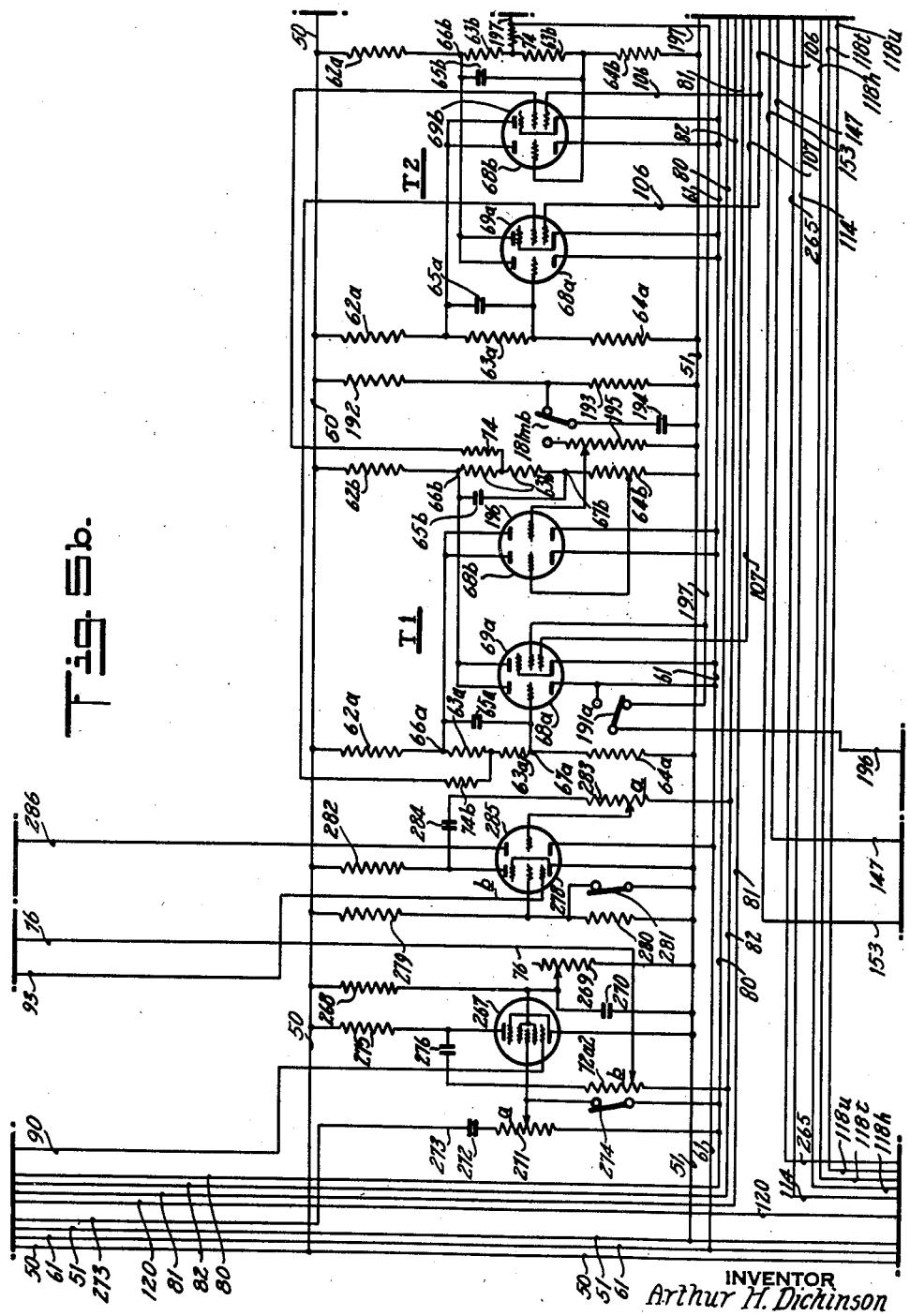

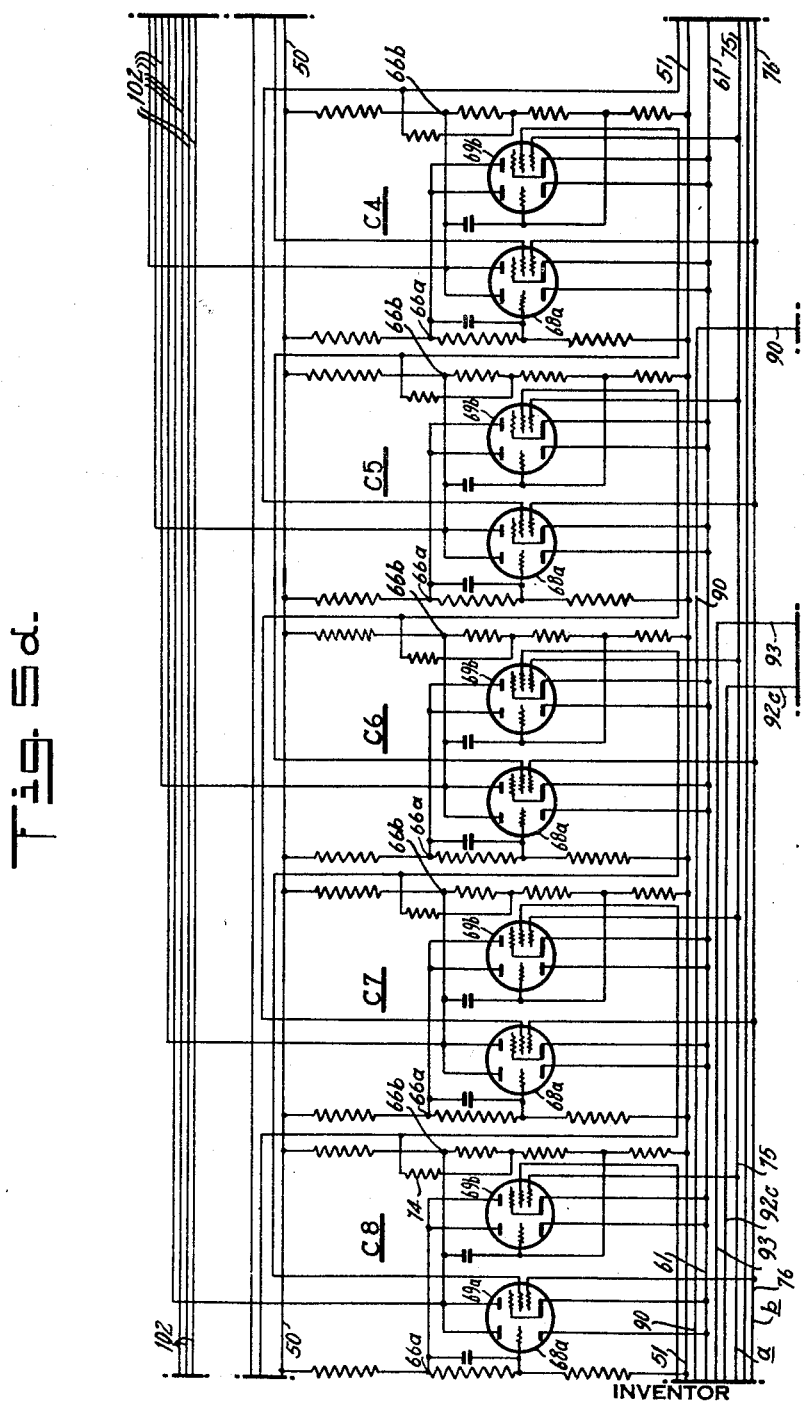

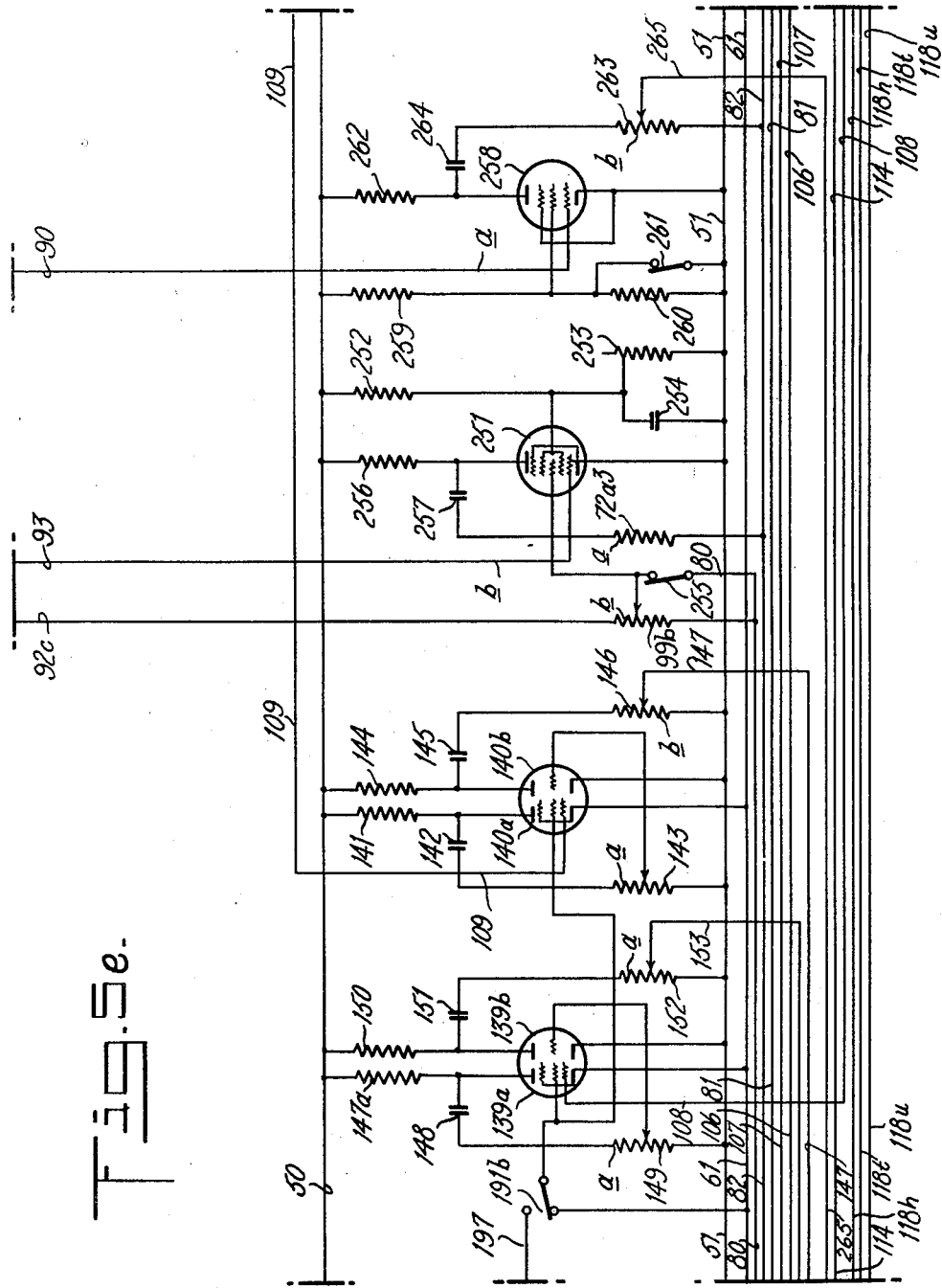

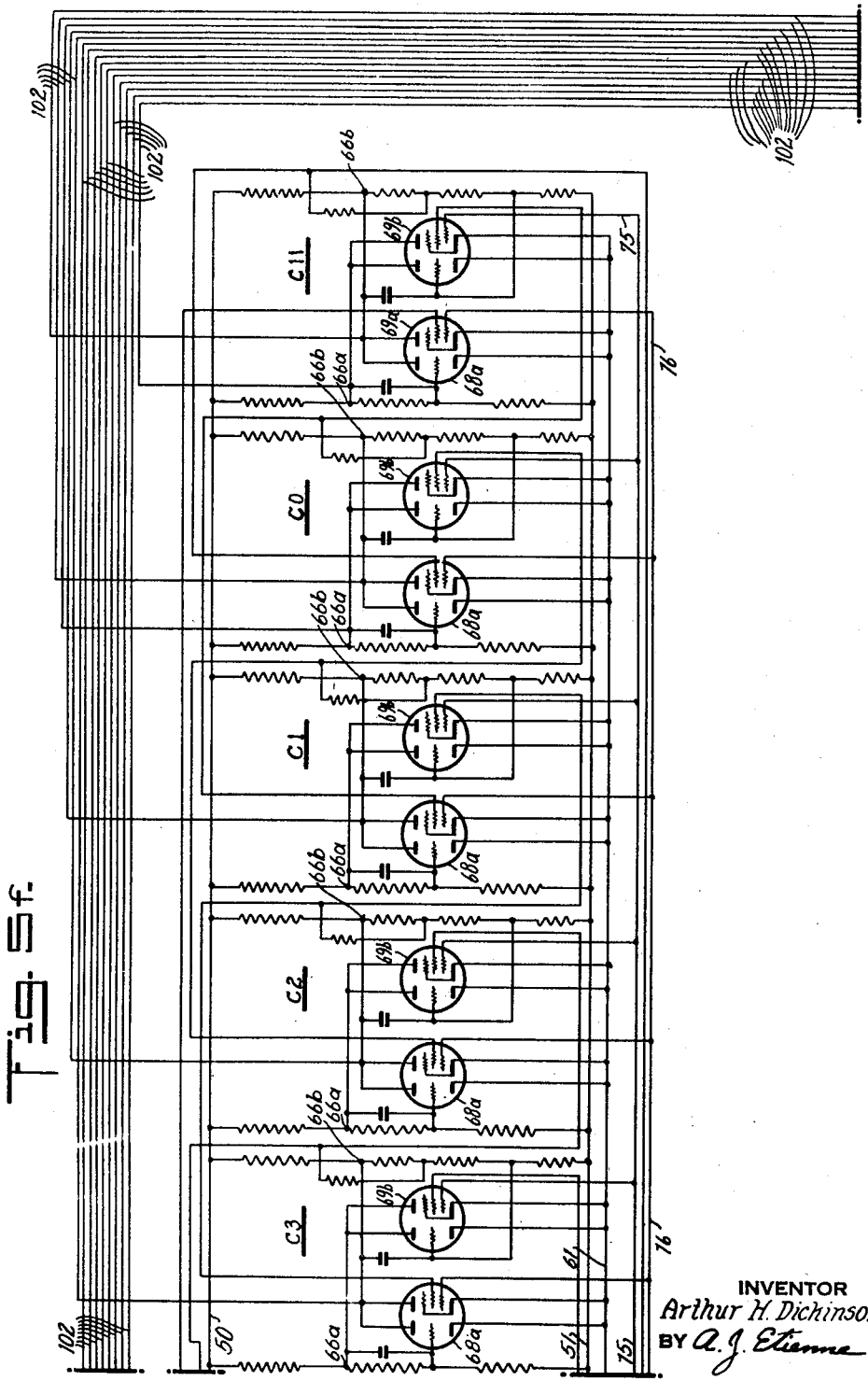

A. H. DICKINSON 2,514,036

SELECTIVE NUMBER ELECTRONIC PULSE PRODUCER

Original Filed May 23, 1941

INVENTOR
Arthur H. Dickinson
BY A. J. Etienne

ATTORNEY

Patented July 4, 1950

2,514,036

UNITED STATES PATENT OFFICE 2,514,036

SELECTIVE NUMBER ELECTRONIC PULSE PRODUCER

Arthur H. Dickinson, Greenwich, Conn., assignor to International Business Machines Corporation, New York, N. Y., a corporation of New York Original application May 23, 1941, Serial No. 394,881. Divided and this application June 28, 1947, Serial No. 757,766

10 Claims. (Cl. 177—380)

The present invention relates to a selective number, pulse producer for producing pulses representative of selected digits and embodying solely electronic means.

More particularly, the present invention is a division of applicant's copending application Serial No. 394,881 filed May 23, 1941 entitled Accounting Apparatus and is directed to the means of said parent application for producing, by solely electronic means, a number of discrete electrical oscillations or pulses representative, by their number, of the value of a digit selected for entry into an accumulator which may be of the type disclosed in said pending parent application or any type of accumulator or computing device controllable by an electrical manifestation.

Prior devices have been employed for producing electrical representations of digits but these have employed means having mechanical inertia. Accordingly one of the objects of the present invention is to provide a substantially inertialess device including timing means for selectively producing electrical pulses, in number equal to the value of the digit selected.

Another object is to provide solely electronic means, controlled by digit selectors, these same means producing a manifestation representative of a single digit selected or producing selected different manifestations, each representative of a digit of a multidenominational number selected.

A further object is to provide solely electronic means, controlled by digit selectors, to produce a number of pulses, representative of the nines complement of a digit selected.

Another object is to provide solely electronic means, controlled by digit selectors, to produce a number of pulses, representative of the tens complement of a digit selected.

Still another object is to provide means producing a timed manifestation representative of a digit and solely electronic means controlled by said timed manifestation for producing a number of pulses or oscillations representative of the digit.

A further object is to provide novel pulse producing means for selectively producing a number of pulses, each number representative of a selected digit and comprising a source of pulses or oscillations and electronic trigger means, operable from an initial condition to a timed second condition and controlling said source during one of said conditions to produce a number of pulses representative of a selected digit.

Another object is to provide a novel selective number pulse producer comprising a source of oscillations, a blocking or gate tube controlling said source and means producing a timed manifestation representative of a selected digit for controlling said blocking or gate tube to produce a number of pulses representative of the selected digit.

Still another object is to provide a novel selective number, pulse producer comprising a source of oscillations, a blocking or gate tube controlling said source, an electronic trigger controlling said blocking or gate tube and means including a digit selector for controlling said trigger.

A further object is to provide a novel selective number, pulse producer comprising a source of oscillations, electronic means effective to control said oscillations from said source to produce a selective number of oscillations and means rendering said electronic means inoperative after said selected number of oscillations is produced.

Other objects of the invention will be pointed out in the following description and claims and illustrated in the accompanying drawings, which disclose, by way of example, the principle of the invention and the best mode which has been contemplated, of applying that principle.

In the drawings:

Fig. 1 is a basic wiring diagram of a novel trigger circuit employed in the invention.

Fig. 2 is a wiring diagram of a modification of the trigger circuit of Fig. 1.

Fig. 3 is a basic wiring diagram of the electronic commutator employed in the invention.

Fig. 4, parts a and b are diagrammatic illustrations, on an enlarged scale, of pulses employed for controlling trigger elements of the electronic commutator shown in Fig. 3 and parts c, d and e are diagrammatic illustrations, on an enlarged scale, of voltage conditions resulting from the operation of the trigger elements comprising said commutator.

Fig. 5 is a diagrammatic illustration of the grouping and arrangement of the figures, which assembled together constitute a complete wiring diagram of the invention.

Figure 5C:
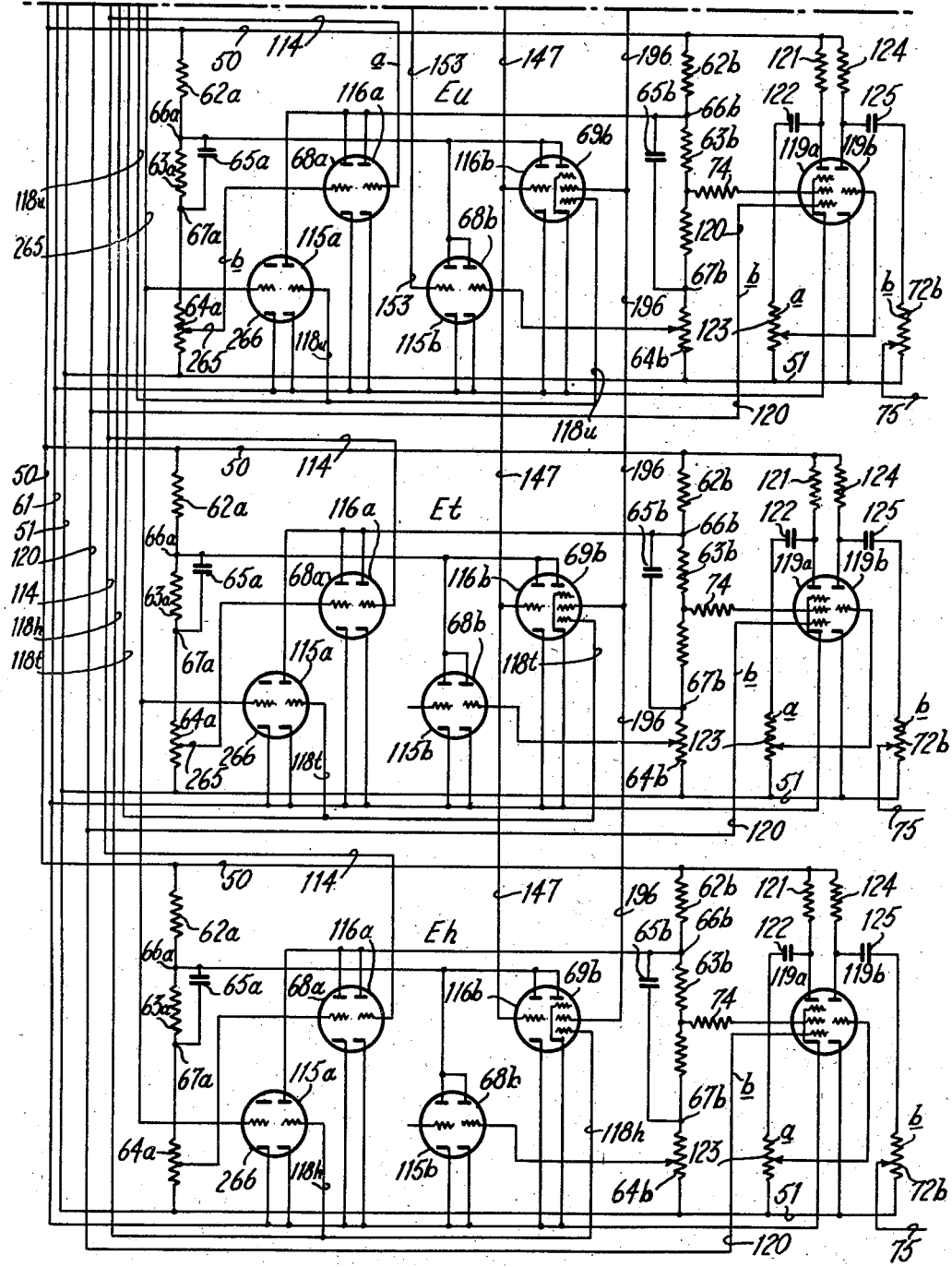
Figure 5G:
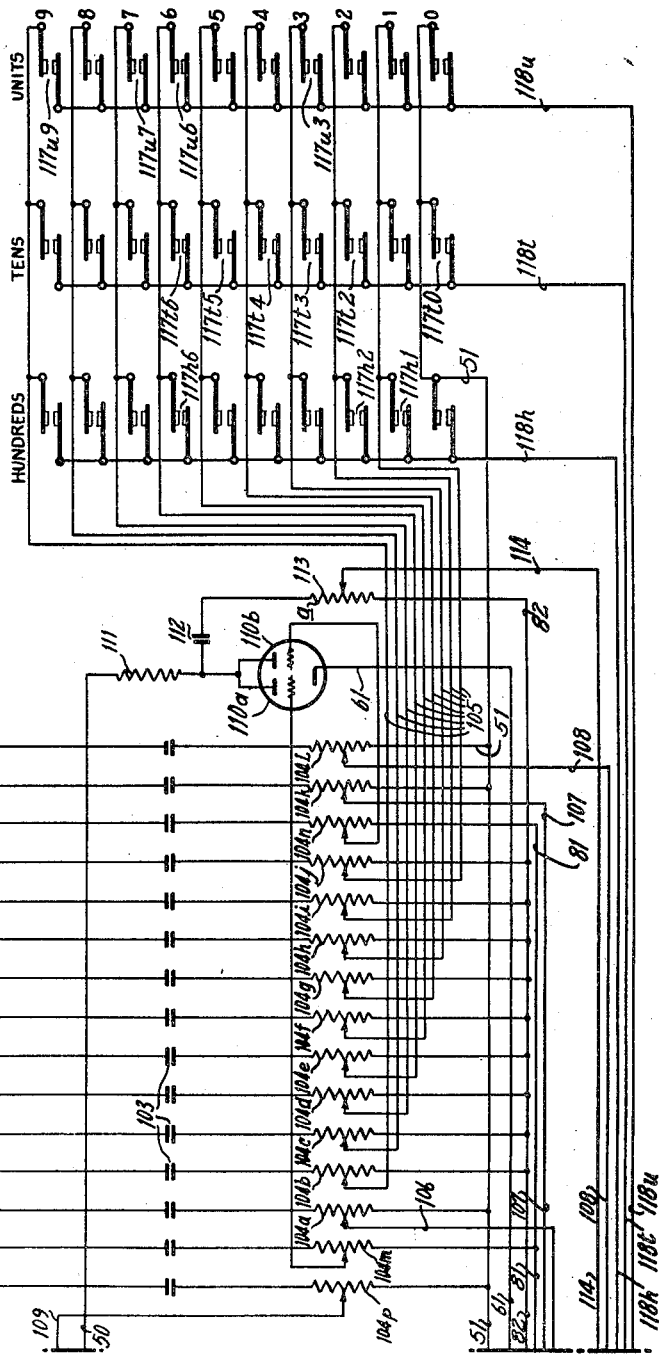

Figs. 5a to 5g, inclusive, grouped together and arranged as shown in Fig. 5, comprise the complete wiring diagram of the invention.

Fig. 6, parts a and b are diagrammatic illustrations of wave forms of oscillations produced in the output of an oscillator utilized in the invention and parts c and d illustrate such wave forms, respectively, after their conversion to peaked pulses.

Fig. 7, parts a to n, inclusive, and parts p are diagrammatic illustrations of wave forms illustrating the voltage conditions resulting from the operation of trigger elements comprising an electronic commutator which is employed for producing control and digit representing pulses.

Fig. 8, parts *a* to *n*, inclusive, and part *p* are diagrammatic illustrations of pulses produced after conversion of the wave forms shown in Fig. 7, parts *a* to *n*, inclusive, and Fig. 7 part *p*, while Fig. 8, part *q*, is a diagrammatic illustration of pulses, similarly produced.

For purposes of simplicity the electronic selective number, pulse producer is shown as embodied in a key controlled device. It is to be specifically understood, however, that the digit selection may be made by a record controlled device such as comprises one of the parts of a record controlled tabulating machine generally of the punched card controlled type.

The construction and operation of various basic circuits will first be described, followed by an explanation of how these circuits are employed for producing a selected number of pulses.

1. *General*

The means for producing these electrical pulses may comprise a series of trigger circuits, each as described presently, and connected in cascade to form an electronic commutator producing timed pulses at a number of index points in a machine cycle of a tabulating machine, for example, of the type referred to above. These timed pulses are applied to a control trigger called an entry control which in turn controls a tube referred to as a gate or blocking tube. This gate tube has applied to it, a continuous source of pulses but normally blocks these pulses and will permit only a chosen number to pass, when it is actuated in a manner to be described, for a length of time proportional to a selected digit, whereupon said gate tube is opened or unblocked to permit a number of pulses to pass equal to the value of a digit selected. The length of time that the gate tube is open depends upon the particular timing of that pulse produced by said commutator and selectively rendered effective by a keyboard. For example, if a digit —3— is to be entered additively into a tabulator of the type referred to above, the number 3 key of the keyboard is depressed which closes contacts to selectively render effective the "3" timed pulse produced by the commutator, which "3" timed pulse trips the control trigger to one of its stable conditions to hold said trigger in said stable condition for a length of time equal to the time separation of said "3" pulse and the "0" pulse produced by the commutator. The trigger, while it is held in this condition, renders the gate tube effective to pass through, three pulses, so that it is seen that a number of pulses is produced equal to the value of the digit key selected for operation. The various elements of the selective number pulse producer will now be described.

2. *Trigger circuit*

A basic circuit, which is employed in this invention is illustrated in Fig. 1 as comprising vacuum tubes interconnected by resistances and condensers, as shown. Two triodes of the four vacuum tubes shown are so interconnected in a trigger unit and operate in such a manner that the trigger assumes two conditions of stability. When one of the triodes is conducting, a large amount of current flows through it and the other triode is at shut-off. In other words, in one condition of stability, one of the triodes has a relatively low impedance and the other has a relatively high impedance. In the other condition of stability, the respective conditions of the two triodes is reversed. Controlling impulses are applied to the other two vacuum tubes, which are pentodes, comprising the trigger unit to cause the shift from one condition of stability to the other. Every second impulse brings the trigger to the original condition of stability.

Referring to Fig. 1, voltage of the polarity indicated is supplied to lines 50 and 51 and to a voltage divider consisting of resistances 56 and 57. Voltage is also supplied by means of the divider to line 61, its potential being positive with respect to line 51.

The trigger circuit comprises two impedance networks. One network includes resistances 62a, 63a and 64a, resistance 63a being shunted by coupling condenser 65a. Vacuum tubes 68b and 69b shown in one envelope, in Fig. 1, are connected in parallel between point 66a, located between resistances 62a and 63a, and line 61. The second impedance network consists of resistances 62b, 63b, and 64b, resistance 63b being shunted by coupling condenser 65b. Vacuum tubes 68a and 69a, also shown in one envelope in Fig. 1 are connected in parallel between point 66b, located between resistances 62b and 63b, and line 61. Resistances 62a and 62b are equal in value as are resistances 63a and 63b, and resistances 64a and 64b. The capacities of condensers 65a and 65b are also equal. In actual practice an efficient combination was found when the values of resistances 62a and 64a were each approximately one-third the value of resistance 63a. A suitable value for the capacity of the condenser 65a is of the order of a few hundred micromicrofarads.

Assuming that the grid of triode 68a is substantially at the same potential as line 61, its grid bias will be substantially zero. With resistance 62b properly chosen, triode 68a has an impedance relatively low as compared to that of resistance 62b and its anode and point 66b to which the anode is connected will have a voltage which is not much greater than that of line 61 with large current flow through triode 68a. With resistances 63b and 64b properly chosen, the potential drop across 63b is great enough to maintain point 67b and hence the grid of triode 68b, negative with respect to line 61. With triode 68b negatively biased, it has an impedance greater than that of resistance 62a. Hence the anode of triode 68b and point 66a to which the anode is connected are at a high enough potential so that the voltage drop across resistance 63a will not force the potential of point 67a below that of line 61.

The foregoing describes one condition of stability in which triode 68a has a large current flow therethrough and triode 68b is at shut-off, hence with no current flow therethrough, and point 66a is at a higher potential with respect to lines 61 and 51, than is point 66b. The manner of switching the trigger circuit to the other condition of stability, is as follows.

In order to shift the trigger from one stable condition to the other, pentodes 69a and 69b may be employed. The screen grid (hereinafter designated as a screen) of pentode 69a is connected to a point on a voltage divider consisting of resistors 70a and 71a. The potential of this point being positive with respect to line 61, the screen voltage of pentode 69a is positive with respect to its cathode. The screen of pentode 69b is connected to a point on a voltage divider consisting of resistors 70b and 71b. The voltage of this point is likewise positive with respect to line 61, so that the screen potential of pentode 69b is positive with respect to its cathode. The control grid (hereinafter designated as the grid) of pentode 69a is connected to the control grid of 69b and both are connected to a resistance 72, to which positive pulses are applied in a manner described later. In the absence of any pulse on resistor 72, the negative grid bias of pentodes 69a and 69b is the potential difference between lines 61 and 51 and is sufficiently great to maintain pentodes 69a and 69b at shut-off.

When, however, a positive pulse is applied to resistance 72, there is a simultaneous negative bias reduction of the grids of both pentodes 69a and 69b, but since the anode of pentode 69a is directly connected to that of triode 68a and since the plate voltage of triode 68a and point 66b is very low, this particular bias reduction is ineffective to increase current flow through pentode 69a and thus has no effect on the trigger circuit. The anode of pentode 69b, however, is directly connected to that of triode 68b and to point 66a, and since the potential of this point, with respect to line 61, is relatively high, the simultaneous bias reduction of pentode 69b causes a current flow as follows: From line 50, resistor 62a, pentode 69b, line 61, resistance 57 to line 51, thus causing point 66a to suddenly drop in potential, producing a negative pulse. This negative pulse is fed through condenser 65a to the grid of triode 68a, effecting a sudden increase in the negative grid bias thereof, and reducing current flow through triode 68a and resistance 62b. Point 66b, accordingly, rises in potential, with respect to line 61, to produce a positive pulse which is fed through condenser 65b to the grid of triode 68b, changing its grid bias to substantially zero. Since now the potential of point 66b has risen and that of point 66a has dropped, triodes 68a and 68b assume another condition of stability which is the reverse of that originally described, namely, triode 68a is now shut-off while triode 68b passes a large amount of current. This new status of the trigger circuit will be maintained until another positive pulse is applied to resistance 72. When this occurs, the resulting negative grid bias reduction of pentode 69b is ineffective while that of pentode 69a is effective to increase current flow therethrough, and the trigger is returned to the condition of stability originally described.

It may be noted that to best achieve the operations as described above, the pulses applied to the grids of pentodes 69a and 69b should be of steep wave form. Preferably the R. C. product of the value of resistance 72 and the value of the capacity of any associated condenser should not exceed one-fifth the R. C. product of resistance 63a and condenser 65a. It should also be noted, that negative pulses, applied to the grids of pentodes 69a and 69b, are ineffective, to cause the shifting action explained above, in the particular trigger just described Novel means are now provided for rendering the trigger action selective which are shown and claimed in applicant's divisional application Serial No. 45,924 filed August 24, 1948. In the foregoing description, it is assumed that switches 73a and 73b are in open position, as shown. The closure of switch 73a, shunts out a portion of resistance 71a, thus reducing the screen potential of pentode 69a to substantially that of line 61. Assuming that the trigger condition of stability is such that point 66b is at a high potential, this screen potential reduction prevents any negative grid bias reduction of pentode 69a from being effective in bringing about increased current flow therethrough. Therefore, until switch 73a is opened, successive applications of positive pulses to resistance 72 are ineffective to change the status of the trigger from that condition in which points 66b and 66a are at high and low potentials, respectively.

Similarly, the closure of switch 73b shunts out a portion of resistance 71b, thus reducing the screen voltage of pentode 69b to substantially that of line 61. Such screen voltage reduction, when point 66a is at high potential, prevents any negative grid bias reduction of pentode 69b from being effective in bringing about increased current flow therethrough. Therefore, under these conditions, until switch 73b is opened, successive applications of positive pulses to resistance 72 are ineffective to change the status of the trigger from that condition in which points 66a and 66b are at high and low potentials, respectively. Switches 73a and 73b, therefore, comprise parts of selection means whereby selectivity in operation is obtained.

The condition of the trigger may be determined by observation of a glow discharge (neon) tube 78, which is connected in series with a current limiting resistor, between line 50 and point 66a. When point 66a is at a high potential with respect to line 61, the difference in voltage between it and line 50 is insufficient to ignite tube 78. When point 66a, however, is at a low potential (point 66b at high potential), the difference in voltage is great enough to cause neon tube 78 to fire. This indicates that the trigger, as a whole, is "on."

That portion of the circuit of Fig. 1 within the broken line enclosure finds extensive use in various portions of the electronic pulse producer. For purposes of simplicity, this enclosed portion will be hereinafter termed a trigger element and it will also be understood as described in connection with the ignition of neon tube 78 that when points 66b and 66a are respectively at high and low potentials, with respect to lines 61 and 51, the trigger element is in an "on" status and that when the potentials of points 66b and 66a are respectively low and high, with respect to lines 61 and 51, the trigger element is in an "off" status. The voltages which exist at points of the trigger such as points 66b and 66a, and which vary in accordance with the conditions of stability, are employed for many control purposes, as subsequently explained.

The circuit of Fig. 2 also relates to a triggering circuit, which is substantially similar to that just described in connection with Fig. 1. Portions of this circuit, which correspond in character and function to portions of the circuit of Fig. 1, are given the same reference characters. With regard to the arrangement of Fig. 2, it also may have two conditions of stability, but in lieu of deriving pulses from a common source and applying them to two circuit points to shift the condition of stability, two sources of pulses, such as resistances 72a and 72b are employed. It is assumed that such pulses do not occur simultaneously. The grid of pentode 69a is connected to resistance 72a and whenever a positive pulse, occurring at one time, on 72a is applied to the grid of 69a, there is an increased current flow through 69a, assuming that triodes 68a and 68b have high and low impedances, respectively, and the circuit shifts to a stable condition in which points 66b and 66a are at low and high potentials, respectively. With the circuit in this last status, a positive pulse occurring, at another time, on resistor 72b reduces the negative grid bias of pentode 69b causing increased current flow therethrough and the trigger is shifted to the opposite condition of stability, wherein points 66b and 66a are at high and low potentials, respectively or in other words the trigger, as a whole, is "on." The manner in which the circuit shifts from one condition of stability to the other is similar to that described in connection with the circuit in Fig. 1. Selection means, as in the circuit of Fig. 1, are provided, since it is obvious that closure of switch 73a (Fig. 2) prevents pulses applied to resistor 72a from being effective while the closure of switch 73b prevents pulses applied to resistor 72b from being effective. Manipulation of switches 73a and 73b, therefore, permits selective operation of the circuit. This modification of the triggering circuit, which includes the two sources of pulses, is employed extensively in the circuits of the electronic pulse producer. That portion of the Fig. 2 circuit within the broken line enclosure, is identical in structure to that portion in Fig. 1 within the broken line, except that the control grids of pentodes 69a and 69b are not interconnected. This portion, therefore, is called a trigger element, and it, along with its two sources of pulses, forms the basis of the electronic commutator presently to be described.

While tubes 69a and 69b have been shown as pentodes in the circuits of Figs. 1 and 2, it will be understood that one or both of these vacuum tubes may be triodes, like tubes 68a and 68b. When tubes 69a and 69b are triodes, however, no screen grids are available to afford the trigger circuit the novel feature of selectivity provided by the selection means as set forth above.

3. Electronic commutator

The purpose of this commutator, which is of a type as shown and claimed in applicant's copending application, Serial No. 394,884 filed May 23, 1941, is to provide means whereby various results may be obtained at high rates of speed and without the undesired effects of inertia when the circuit functions continuously with respect to a given time base. The circuit employs vacuum tubes and associated impedances, the trigger element as employed in Fig. 2 and described in section 2, being utilized as a fundamental unit. The number of units which are employed depends upon the number of steps through which it is desired to progress before the commutator circuit repeats its function.

Assuming that one of the trigger elements comprising the commutator is "on" and the remaining ones are "off," the former element so conditions the next succeeding or second element, that upon the occurrence of a pulse, termed an advancing pulse, this conditioned element is turned on. This next element, in turn, when "on," conditions the element just preceding, so that upon the occurrence of a pulse, termed a restoring pulse, which occurs prior to the next advancing pulse, the first preceding element is turned off. The second element, which is now "on," in turn conditions a third element so that when the following advancing pulse occurs, this third element is switched on. In such status the third element, so conditions the second element, that upon the occurrence of the next restoring pulse, the second element is turned off.

This is a general explanation of the operation of the commutator when two advancing and two restoring pulses cause the "on" circuit position to advance by two. Where advancing pulses no longer applied the third element would stay "on" and the remaining ones "off." When, however, the advancing pulses were again applied, stepping operations would again occur and a fourth, fifth, sixth, etc., element would be turned on in sequence. Should the total number of trigger elements be ten, the first element would be switched on under control of the tenth one and the commutator could thereafter repeat its cycle of operation. It is seen, therefore, that the elements are so interrelated and so intercontrol one another, that upon the application of succeeding advancing and restoring pulses, there is a step-by-step operation of each of the elements to first an "on" and then to an "off" status. Each element is so operated in a definite order, and, when the final one of a series is operated, one cycle of the commutator is completed and a new cycle can be initiated.

The principle and details of operations of the electronic commutator may be understood by reference to Fig. 3 which illustrates a basic circuit comprising only three positions, it being understood that the number of positions can be chosen as desired. The number of trigger elements in Fig. 3 is therefore three and they are designated respectively, as S1, S2, and S3. Portions of the circuit of Fig. 3 which correspond in character and function to those of the circuit of Fig. 2 are given the same reference characters.

Referring to Fig. 3 and assuming that trigger S1 is "on" and S2 and S3 are "off," the manner in which the latter two trigger elements are turned on in succession will now be described. It is also assumed that advancing pulses of the character shown in Fig. 4a, for example, are applied to resistance 72b (Fig. 3) and that restoring pulses of the character shown in Fig. 4b, for example, are applied to resistance 72a. It is to be noted that the pulses shown in Figs. 4b and 4a are of the same frequency but 180 degrees out of phase. Such symmetrical separation of the pulses, however, is not essential.

The screen of pentode 69b (S2) is connected to the midpoint 77 of resistor 63b (S1) through a screen current limiting resistor 74. By virtue of this circuit arrangement, the screen voltage of pentode 69b (S2) is determined by that of point 77 and, if S1 is "off," point 77 is near the potential of line 61, whereas, if S1 is "on," point 77 is at a high potential with respect to line 61. When the screen voltage of pentode 69b (S2) is low, a reduction of its negative grid bias has no effect on it. That is, a low screen voltage of pentode 69b (S2) serves as a shut-off. On the other hand, when the screen voltage of pentode 69b (S2) is high, a reduction of its negative grid bias causes increased current flow therethrough. For the normal grid bias applied to the grid of pentode 69b (S2), a rise in its screen voltage has no effect on current flow through the tube.

Assuming S1 is "on," point 66b (S1) and the screen of tube 69b (S2) are at a high potential, so that S1 conditions S2 in order that it may be turned on, when an advancing pulse is applied to the grid of its tube 69b. An advancing pulse Fig. 4a applied to resistor 72b is effective via line 75 to reduce the negative grid bias of tube 69b (S2) increasing current flow therethrough and thereby tripping S2 to an "on" status (section 2). The rise in potential of point 66b (S2), coinciding with an advancing pulse, is indicated in Fig. 4d. Comparison of this figure with Fig. 4c indicates that momentarily, both S1 and S2 are "on."

The screen of pentode 69a (S1) is connected to the midpoint 77 of resistor 63b (S2) through a screen current limiting resistor 74. By virtue of this circuit arrangement the screen voltage of pentode 69a (S1) is determined by that of point 77 (S2). If S2 is "off," point 77 is near the potential of line 61, and, if S2 is "on," point 77 is at a high potential with respect to line 61. Thus the screen voltage of pentode 69a (S1) varies in the same manner. When the screen voltage of pentode 69a (S1) is low, a reduction of its grid bias has no effect, that is, a low screen voltage of tube 69a (S1) acts as a shut-off for the tube. On the other hand, when the screen voltage of tube 69a (S1) is high, a reduction of its negative grid bias causes increased current flow therethrough. For the normal bias applied to the grid of tube 69a (S1) a rise in its screen voltage has no effect on current flow through the tube.

Since, as described above, S2 is now "on," point 77 of S2 and the screen of tube 69a (S1) are at a high potential, so that S2 conditions S1 in order that it may be turned off when a restoring pulse is applied to the grid of tube 69a (S1). A restoring pulse (Fig. 4b) applied to resistor 72a is effective via line 76, to reduce the grid bias of pentode 69a (S1) increasing current flow therethrough, and thereby tripping S1 to an "off" status, in the manner described in section 2. As a result of this operation, point 66b (S1) drops to a low potential, as indicated in Fig. 4c.

If no further pulses are applied to resistances 72b and 72a, S2 remains "on" and S1 and S3 remain "off." This would be indicated by the fact that the neon tube 78 (S2) would be ignited while those related to S1 and S3 would be dark.

If it be assumed, however, that advancing and restoring pulses are continuously applied to resistances 72b and 72a, respectively, the commutator of Fig. 3 will be continuously operated. To continue the above description, with trigger S2 "on," there is a conditioning of trigger S3 so that the next advancing pulse applied to resistance 72b is effective to trip on S3. The resultant potential rise of point 66b (S3) coinciding with an advancing pulse is indicated in Fig. 4e. It is seen, from a comparison of Fig. 4e with Fig. 4d, that momentarily, both S2 and S3 are "on." With S3 "on," it coditions S2 so that it may be shut off by the next restoring pulse on resistor 72a. The resultant potential fall of point 66b (S2) coinciding with a restoring pulse, is indicated in Fig. 4d. S3 (Fig. 3) being "on," also conditions S1 so that it may be turned on when the succeeding advancing pulse appears on line 75. When S1 is turned on, point 66b (S1) rises in potential, as is shown in Fig. 4c. S1, being "on," conditions S3 so that the latter is tripped "off" upon an application of the succeeding restoring pulse to line 76. The resultant potential fall of point 66b (S3) coinciding with a restoring pulse, is indicated in Fig. 4e.

It is now obvious that as long as advancing and restoring pulses are applied to the commutator circuit the trigger elements S1, S2, S3, S1, and so forth, are tripped on and off sequentially and also independently of inductive or capacitative coupling. It is also seen that a given element cannot be switched on until its predecessor element is "on" and that a given element cannot be switched off until the succeeding element is "on." With this circuit arrangement, step-by-step progression, from one element to the next, is positive in character. This electronic commutator is utilized in this invention as a means for sequentially producing timed pulses.

Further consideration of the commutator circuit of Fig. 3 indicates that advancing pulses, when applied to resistor 72b, are effective via line 75 to concurrently reduce the negative grid bias of all pentodes 69b, each comprising a part of elements S1, S2, and S3, respectively. Likewise, restoring pulses, applied to resistor 72a, are effective via line 76 to concurrently reduce the negative grid bias of all pentodes 69a of these elements, respectively. It will be appreciated, however, that a negative grid bias reduction of a tube 69b, due to an advancing pulse, can cause increased current flow therethrough, only when its screen is at high potential, and such screen is at this potential, only when a preceding element is "on." This preceding element is the sole one which is "on" when an advancing pulse is applied. Therefore, the reduction of grid bias for all tubes 69b is selectively effective, only in the conditioned one, and it, alone, is tripped on. It will also be understood that a negative grid bias reduction of a tube 69a, due to a restoring pulse, causes increased current flow therethrough, only when its screen grid is at high potential, and such grid is at this potential, only when a succeeding element is "on." Therefore this reduction of negative grid bias of all tubes 69a is selectively effective, only in the conditioned one, to trip it off (all other elements, save the succeeding one, already being off and this one having no properly related "on" element to trip it off).

Assuming, as before, that S1 is "on," then the screen of pentode 69b (S2) is at a high potential and an advancing pulse, which reduces its grid bias, causes increased current flow therethrough, and S2 is tripped on, as is now understood. As such action occurs, point 77 (S2) begins to rise in potential as does also the screen voltage of tube 69b (S3) connected to said point. It would therefore appear, at first blush, that the advancing pulse which trips on S2, might, by virtue of the resulting screen voltage rise of tube 69b (S3), also cause S3 to trip to an "on" status. This rise in potential of point 77 (S2) however, to its full value, is not instantaneous, but occurs exponentially (see Fig. 4d) so that an interval of time elapses from the instant of pulse application until point 77 (S2) reaches its maximum high potential and the same applies also to the screen voltage rise of tube 69b (S3). This time interval exceeds the duration of an advancing pulse so that said pulse ceases to exist by the time that the screen of tube 69b (S3) reaches its maximum potential. Under these circumstances, pentode 69b (S3) experiences concurrently an increase of negative grid bias (because the amplitude of the advancing pulse is decreasing from its positive peak value) and an increase of positive screen voltage, which two conditions oppose each other and thus prevent any substantial current flow through the pentode. It is seen, therefore, that only one element is tripped on for each advancing pulse.

4. Oscillator and amplifiers

A source of continuously occurring oscillations or pulses is required for various purposes, such as for operating the electronic commutator, and as a source of pulses to a gate tube. Preferably, the source comprises an oscillator whose output is amplified for these purposes. Since the operation of the various circuits herein depends only upon the occurrence of pulses, the oscillator is not frequency stabilized and is free to drift about a mean base frequency. Such frequency drift, great or small, does not make circuit action any the less positive than if the frequency of the oscillator were maintained as constant as possible, since an operation or operations in any of the circuits cannot occur, unless a pulse actually exists, and no such pulse exists until the oscillator has generated it. Therefore, variations in the time duration of the periods between successive cycles of the oscillator are without effect on the positive and accurate operation of the device comprising this invention.

As will be seen from the parent application Serial No. 394,881 an electronic accumulator controlled by the pulse producing means of instant application functions upon a cyclical basis, there being one machine cycle employed during the entry of a single desired amount. The duration of time corresponding to one machine cycle determines the base frequency of the oscillator. In said parent application, a single machine cycle is divided into twelve equal portions, called index point positions. Since a pulse may be required at any one of the twelve index point positions, the oscillator must necessarily make available such pulses which are separated by periods equal to one twelfth of a cycle duration. That is to say, the oscillator must function at a rate which is twelve times the machine cycle rate. For example, if one cycle of an electronic accumulator is to occur in one two hundred and fortieth of a second or at the rate of 240 machine cycles per second, the frequency of the oscillator is adjusted at 12×240 or 2880 cycles per second.

The oscillator employed herein is of the type commonly known as a multivibrator. Essentially, it consists of a two-stage, resistance coupled amplifier in which the output of the second stage is fed back to the input of the first stage. Such an oscillator is capable of producing either square topped or saw toothed waves, depending upon the particular part of the oscillator circuit from which the waves are derived. The square topped waves are employed herein because they are easily changed into pulses of extremely sharp wave front and short duration. The circuit diagram of the multivibrator and its principle of operation will now be described in detail.

Referring to Fig. 5a, closure of the double blade switch 79 supplies voltage to lines 50 and 80, and to a voltage divider consisting of resistances 56, 57a, 57b, 57c, and 58. Potential is also supplied by means of this divider to lines 61, 81, 82, and 51, their potentials being positive with respect to each other in the order given and with respect to line 80. The oscillator comprises triodes 83a and 83b and associated resistances and condensers. The anodes of the respective triodes are connected to line 50 through load resistors 84a and 84b and the cathodes are directly connected to line 51.

The anode of triode 83a is coupled back to the grid of triode 83b by means of coupling condenser 85b which is also connected to line 51 through the grid leak resistance 86b. The anode of triode 83b is coupled back to the grid of triode 83a by means of coupling condenser 85a, which is also connected to line 51 through the grid leak resistance 86a. With this circuit connection, the normal bias of the grids of triodes 83a and 83b is zero. Such an arrangement is unstable and oscillations are initiated by a minute change of emission of either tube. Assuming that the current through 83a momentarily increases, this produces an increased voltage drop across resistance 84a and a decrease in potential across triode 83a. This decrease is fed by coupling condenser 85b to the grid of triode 83b, making it more negative. Current through 83b is decreased, decreasing the voltage drop across resistance 84b and producing an increase in potential across 83b. This increase is equal to the original decrease across 83a multiplied by the amplification factor and is thus much higher. Coupling condenser 85a conveys this potential change to the grid of triode 83a making said grid much less negative, with a resulting rapid increase in the current through triode 83a. The voltage drop due to this increased current is in turn fed to triode 83b with cumulative results. Actually, the current flow through triode 83a is increased to a high value, substantially instantaneously, which flow reaches a maximum when the grid of triode 83b has a negative potential great enough to reduce the current flow in triode 83b to zero. When this condition is reached, the charge on condenser 85b commences to leak off through resistance 86b, the time consumed being determined by the time constant of the condenser 85b and resistance 86b. When this leakage is completed, current flow in triode 83b begins and the operation described above reverses, that is, the grid of triode 83a will instantaneously become negative, shutting off flow through 83a and the grid of triode 83b will instantaneously become slightly positive and heavy flow will occur in 83b.

It will now be understood that a heavy current flows alternately and for a given period of time through each of the triodes 83a and 83b. When one is conducting, the other is shut off, this situation then instantaneously reverses and said one is shut off and the other conducts. This produces alternate and sustained voltage drops across resistors 84a and 84b, these voltages being 180 degrees out of phase with each other. These voltages are in the form of square-topped waves, easily converted into pulses that possess a steep wave-front and are extremely short in duration.

Fig. 6a diagrammatically illustrates one machine cycle and shows that the voltages (with respect to line 51) which occur across resistor 84a (Fig. 5a) are as stated above, square-topped in form and occur twelve times per cycle. Fig. 6b also illustrates one machine cycle and shows that the voltages (with respect to line 51) which occur across resistor 84b (Fig. 5a) are square-topped in form and occur twelve times per cycle.

Since, as stated above, these voltages are 180 degrees out of phase, the potential of point 87a (Fig. 5a) rises at each of the twelve index point positions and drops midway between index points while the potential of point 87b rises midway between each of the twelve index point positions and falls at each index point. One cycle of oscillator operation is that period between successive potential rises of point 87a, for example, and its time duration in seconds is equal to the sum of the time constants of condenser 85a and resistor 86a and of condenser 85b and resistor 86b, respectively.

A rise in potential of point 87a causes charging of condenser 88a and current flow through resistor 89a to line 80. By suitably choosing the value of condenser 88a so that its recovery time is extremely short, the rise in potential of 87a produces on resistor 89a, a positive pulse of extremely short duration having a steep wave-front. A decrease in the potential of point 87a causes condenser 88a to discharge and a negative pulse of the character just noted is thereby produced on resistor 89a. Since the rise and fall of point 87a is constantly recurring, positive and negative pulses are continually produced on resistance 89a, of the form as shown in Fig. 6c. In a similar manner, positive and negative pulses are continually produced on resistance 89b (Fig. 5a) due to the rise and fall in potential of point 87b and these pulses are illustrated in Fig. 6d. It is to be noted, that, as would be expected, the pulses on these resistances are 180 degrees out of phase.

Pulses of the character shown in Figs. 6c and 6d are employed in many parts of the circuit. To simplify the description, pulses, having positive and negative peaks occurring in time sequence, as shown in Fig. 6c, are termed a-phased and lines conducting such pulses are denoted by a. Pulses, having positive and negative peaks, occurring as shown in Fig. 6d, are termed b-phased and lines conducting such pulses are denoted by b. These pulses, respectively, are amplified and reversed in phase, prior to utilization in various ways, such as, for example, in operating the electronic commutator, in controlling the selective number, pulse production, and in other control purposes. The amplifier circuits will now be described.

A line 90 extends from resistor 89a to the grids of amplifying tubes 91b and 92b (Fig. 5a). A line 93 extends from resistor 89b to the grid of amplifying tubes 91a and 92a. The anodes of tubes 91a and 91b are connected to line 50 through load resistors 94a and 94b, and the cathodes of these tubes are directly connected to line 51. The anodes of tubes 92a and 92b are connected to line 50 through load resistors 95a and 95b, and the cathodes of these tubes are directly connected to line 51. Line 80 is negative with respect to line 51, and since resistors 89a and 89b terminate in line 80, its negative potential is the normal grid bias for tubes 91b and 92b, and 91a and 92a.

A positive pulse on resistor 89a reduces the negative grid bias of tube 91b, increasing current flow therethrough and the potential drop across resistance 94b. Condenser 96b discharges and an amplified negative pulse is produced on resistance 98b. A negative pulse on resistor 89a increases the negative grid bias of tube 91b, decreasing current flow therethrough and the potential drop across resistance 94b. Condenser 96b becomes more charged and an amplified positive pulse is produced on resistance 98b. It is to be particularly noted that the amplified pulses appearing on this resistance are b-phased and are therefore similar to those shown in Fig. 6d, while the pulses applied to the grid of tube 91b are a-phased. The manner in which tube 92b (Fig. 5a) functions to also produce b-phased pulses, via line 92c (Figs. 5a, 5d and 5e) on resistance 99b (Fig. 5e) is similar to that just described in connection with tube 91b (Fig. 5a). Likewise, the manner in which the b-phased pulses on resistance 89b control tube 92a to produce a-phased amplified pulses on resistor 72b is similar to that described in connection with the action of tube 91b. Such pulses are similar to those shown in Fig. 6c.

The foregoing has described the manner in which an oscillator of the multivibrator type is employed to produce square-topped waves, which are converted into pulses of extremely sharp character, and amplified, with reversal in phase, until suitable for use in various portions of the electronic pulse producer. It has been shown that two groups of pulses are produced, one of positive polarity occurring at index point positions of a machine cycle and designated as a-phased and the other of positive polarity occurring midway between index points and designated, as b-phased. In some few instances the negative pulses are utilized, as will be explained in detail later. The manner in which both group of positive pulses are employed for controlling an electronic commutator for producing definitely timed pulses will now be described.

5. Control of electronic commutator to continuously produce timed pulses

In sect. 4, it was stated that the electronic accumulator operates on a cyclical basis. In the accumulator of parent application Serial No. 394,881 each entry operation requires a machine cycle, which cycle is divided into twelve equal portions, termed index point positions. As employed in the following description, an expression such as "1," may be considered to mean: the "1" time, or the "1" index point position, in a complete machine cycle. Pulses, which are produced directly by the multivibrator and which appear amplified and reversed in phase on resistors 98b, 72b (Fig. 5a) and 99b (Fig. 5e) are not "tied in" with a machine cycle. That is to say, no pulse appearing on these resistances can be specifically designated as a "9," an "8," etc., pulse. Coordinating means, operated by these directly produced uncoordinated pulses, are provided to produce pulses which are grouped into or "tied in" with a machine cycle, each pulse included in the group having a differential timed significance within the machine cycle. This coordinating and timed pulse producing means comprises the electronic commutator, whose principle of operation was described above (section 3, Fig. 3). This commutator serves as a common pulse producing means for the keyboard and for the entry control triggers, electrical signals representative of a digit thus being selectively produced by the keyboard and a "0" timed pulse being applied to the entry control triggers to invariably flip them at this time. In this manner the keyboard and the entry control triggers are supplied with timed pulses which are maintained in step with each other by the time separation produced by the commutator. The circuit diagram of this pulse producing commutator is illustrated in Figs. 5a, 5d and 5f. This commutator produces both a-phased and b-phased pulses and of both positive and negative polarity, at each of the twelve index point positions comprising one machine cycle, and each trigger element of the commutator is capable of producing, one a-phased pulse and one b-phased pulse. The timed or coordinated pulse producing means, therefore comprises twelve trigger elements C12, C9 etc. . . . C1, C0 and C11, said trigger elements being of the type already described (section 2, Fig. 2). Portions of the commutator circuit shown in Figs. 5a, 5d and 5e which correspond in character and function to those of the circuits shown in Figs.

2 and 3 are given the same reference characters. Since all trigger elements are similar, a complete set of reference numerals is applied only to C12 (Fig. 5a).

Resistor 72b (Fig. 5a), previously described, is similar in function to resistance 72b (Fig. 3) in that it supplies a-phased pulses continually to line 75 (Figs. 5a, 5d and 5f) whenever the machine is in operation, for the purpose of turning on the trigger elements of the electronic commutator i. e., they are advancing pulses.

Resistance 72a2 (Fig. 5b) is similar in function to resistance 72a (Fig. 3) in that b-phased pulses thereon are effective via line 76 (Figs. 5b, 5a, 5d and 5e) to turn off trigger elements of the electronic commutator. The manner in which b-phased pulses are produced on resistance 72a2 (Fig. 5b) will be described later (section 9) but it is sufficient to state at this time that such pulses are continually applied to line 76 whenever the machine is in operation.

When starting up the machine, switch 101 (Fig. 5a) is initially closed, thereby shunting out a portion of resistance 72b and placing line 75 at the potential of line 51. Under this condition, pulses produced on resistance 72b are ineffective to turn on trigger elements of the commutator.

Prior to effecting entries into the machine, the commutator is conditioned, in a manner to be described in detail in section 9, but it is sufficient to state at this time that the result of this conditioning is to turn off the elements C9, C8, etc., and to turn on, solely, the element C12.

Following the conditioning operation, switch 101 is opened, and thereupon advancing pulses on resistance 72b continuously control the turning on of the various trigger elements of the electronic commutator.

The manner in which advancing and restoring pulses are employed to sequentially turn on and off each of the elements C12, C9, C8, etc., is as previously explained in section 3 with respect to Fig. 3. In the circuit of Fig. 3, a commutator comprised of only three trigger elements is illustrated, whereas in Figs. 5a, 5d and 5f the commutator comprises twelve trigger elements. The principle of sequential operation is, however, exactly similar in both commutators. From the prior description, it will be understood that each and every one of such trigger elements becomes turned on and off sequentially, prior to a repetition of a commutator cycle, or in other words, one complete operation of all elements of the commutator constitutes a machine cycle and the element C12 demarcates the beginning and terminating point of each cycle. It is to be noted that as long as the machine is in operation and following a conditioning operation, as noted above, advancing and restoring pulses are applied to lines 75 and 76, respectively, so that the commutator remains in continuous operation.

As previously stated, the pulses chosen as advancing pulses for the commutator are a-phased, and in view of the explanation given in section 3, it will be understood that whenever a point 66b of a trigger element, rises in potential under control of an advancing pulse (or a point 66a falls), such action occurs at an index point time. Since the restoring pulses chosen for the commutator are b-phased, it will also be appreciated that the fall in potential of a point 66b of a trigger element, under control of a restoring pulse (or the rise of a point 66a) occurs midway between index point positions. The times in a machine cycle at which points 66b of the elements C12, C9, C8, etc.. . . . C0, C11, respectively, rise to a high potential and then fall, are shown in Figs. 7a to 7L, inclusive. The times in a machine cycle at which points 66a of the elements C12, C0, and C11 rise to a high potential and fall are shown, respectively, in Figs. 7m, 7n, and 7p.

Figs. 7a and 7n inclusive and 7p indicate that substantially square-topped waves are sequentially produced at points 66b and 66a. These square-topped waves are converted into pulses of sharp wave-front and of extremely short duration for selective number pulse production and for various control purposes. Each pulse is "tied in" and thus has a definite differentially timed relationship within a machine cycle such as "12," "9," "8," etc., which is maintained throughout machine operations, cycle by cycle.

A rise in potential of point 66b (C12) (Fig. 5a) is effective, via one of the lines in the group generally designated 102 (see also Figs. 5d, 5f and 5g), to charge a condenser 103 (Fig. 5g) and to cause current flow through resistor 104a, connected at one end to said condenser 103 and at the other to line 51. The value of condenser 103 is so chosen that its recovery time is relatively short, and therefore this current flow through resistor 104a is in the form of a positive short pulse occurring at "12," which is the same as "D" in a cycle. Upon a fall in potential of point 66b (C12) (Fig. 5a) said condenser 103 (Fig. 5g) discharges and a pulse of negative polarity having a steep wave-front and of extremely short duration is now produced on resistor 104a. The positive and negative pulses produced on resistor 104a are illustrated in Fig. 8a, and it will be observed, that as stated above, the positive pulse occurs at the "12" or "D" index position and that the negative pulse occurs midway between "9" and "8."

In a similar manner, the rise and fall in potential of the points 66b of trigger elements C9 (Fig. 5a), C8, C7, C6, C5, and C4 (Fig. 5d), C3, C2, C1, C0, and C11 (Fig. 5f) produce positive and negative pulses on resistances 104b (Fig. 5g), 104c, 104d, 104e, 104f, 104g, 104h, 104i, 104j, 104k, and 104L, respectively. The different times in a machine cycle at which the respective pulses occur are illustrated in Figs. 8b to 8L, inclusive.

The fall and rise in potential of the point 66a of C12 (Fig. 5a), C0 (Fig. 5f) and C11, produce negative and positive pulses on resistors 104m (Fig. 5g), 104n, and 104p, respectively. The different times in a machine cycle at which these respective pulses occur are illustrated in Figs. 8m, 8n, and 8p, respectively.

Consideration of Fig. 8 indicates that the positive pulses shown in Figs. 8a to 8L, inclusive, occur at the index point times and that the positive pulses shown in Figs. 8m, 8n, and 8p occur at a point midway between index point positions. Except as otherwise specifically noted, only the positive pulses are employed in this invention. It should be noted that the return circuit for resistors 104b to 104j, inclusive (Fig. 5g) comprises line 82, the return circuit for resistances 104a, 104k, 104L, and 104p comprises line 51, and the return circuit for resistances 104m, and 104n comprises line 81.

The foregoing has described a continuously operating commutator which comprises a pulse coordinating means operated by a multivibrator supplying uncoordinated impulses to in turn produce pulses which are grouped into repeated machine cycles, each pulse of a group having a differential timed significance in any one cycle. The timed pulse producing means in the embodiment shown and described comprises an electronic commutator of twelve trigger elements.

Each of the respective "9" through "1" pulses appearing on resistances 104b to 104j, inclusive (Fig. 5g), is a "Digit Representing" pulse and each is applied to one line of a group generally designated 105 for a purpose to be explained subsequently in section 8.

The "12" or "D" pulse on resistor 104a is effective, via line 106 (see also Figs. 5e and 5b), for initiating and also for terminating operation of a single entry control device as described in sect. 8.

The "0" pulse on resistor 104k (Fig. 5g) is effective, via line 107 (see also Figs. 5e and 5b) for terminating operation of the manually controlled portion of the single entry control device, as will be explained in section 8.

The "11" pulse on resistor 104L (Fig. 5g) is effective via line 108 (see also Fig. 5e) for elusive one entry as described in sect. 7.

The "½ after D" positive pulse (see Fig. 8p) obtained from 66a of C11 (Fig. 5f) when C11 is turned off, appears on resistor 104p (Fig. 5g) and is effective via line 109 (see also Fig. 5e) when the device is to be utilized for subtraction, as is described subsequently in section 8.

The grids of triodes 110a and 110b (Fig. 5g) are respectively connected to resistances 104m and 104n. A pulse, negative in this case (see Fig. 8m) obtained from 66a of trigger C12 (Fig. 5a) when C12 is turned on, appears at "12" on 104m and increases the negative grid bias of triode 110a, decreasing current flow therethrough and the voltage drop across load resistance 111. Condenser 112 becomes charged and a positive pulse is produced at "12" on resistor 113.

A negative pulse (see Fig. 8n) obtained from 66a of trigger C0 (Fig. 5f) when C0 is turned on, appears on resistor 104n at "0" and increases the negative grid bias of triode 110b decreasing current flow therethrough, and the voltage drop across load resistance 111. Condenser 112 is charged as before and another positive pulse is produced on resistor 113, this time at "0."

Such "12" and "0" pulses appearing on resistor 113 are illustrated in Fig. 8q and they are effective, via line 114 (Figs. 5g, 5e, 5b and 5c) for terminating selective pulse number production.

Having set forth the details of the electronic commutator for producing differentially timed impulses, a description will now be given of one order of the electronic accumulator, the manner of entry control for effecting entries therein, and the manner of determining and effecting carry operations.

6. Selective digit representing pulse production

When adding, the trigger control device, now to be described and of which one per order is supplied in the accumulator of said parent application, is controlled by a timed pulse representative of a selected digit. The trigger control device thereupon controls a gate tube to pass pulses, whose number is equal to the digit selected, thereby electrically representing said digit by a number of discrete electrical manifestations, which number is equal to the value of said selected digit.

Reference to Figs. 8b to 8j, inclusive, which show the digit representing pulses "0" to "1," respectively, indicates that such pulses have one positive peak only, during one machine cycle, and that such peaks occur at differential times in a cycle, numbered according to the digit represented. Fig. 8b, for example, shows a "9" pulse which occurs, nine index point positions ahead of "0," Fig. 8c shows an "8" pulse which occurs, eight index point positions ahead of "0" etc., to Fig. 8j which shows a "1" pulse which occurs, one index point only, ahead of "0." In other words, the time interval in a machine cycle between any digit representing pulse and "0" is proportional to the value of the particular digit chosen to be entered and the total index points in such interval is numerically equal to the digit.

The trigger control device is called into action at a differential time in a cycle by a digit representing pulse, referred to above, and remains in operation until "0," so that the time interval during which the trigger control device is operating is proportional to the value of the selected digit, and the total index points in such interval is numerically equal to the digit. Thus a gate tube, to be described presently, is held open for a time interval, proportional to the value of a selected digit and permits a number of pulses to pass, equal to the selected digit.

Referring now to Fig. 5c, the trigger control device for the tens order of the accumulator of said parent application (which order is chosen to best illustrate digit pulse production), comprises a trigger element as previously described (Figs. 1 and 2, section 2). This trigger is generally designated Et and portions of Et which correspond in character and function to those of the triggers explained in connection with Figs. 1 and 2 are given the same reference characters. Triode 116b is in parallel with pentode 69b, and it can also be controlled so as to have the same function as pentode 69b, as previously described (section 2), that is, to turn on trigger Et whenever the bias of its grid is reduced. Triodes 115a and 116a are in parallel with triode 68a, and it is to be specifically noted that each may have the same function as pentode 69a (Fig. 2) previously described (section 2), that is, to turn off trigger Et (Fig. 5c) when the bias of each respective grid is reduced.

Normally the trigger Et is "off" and when selective digit pulse production ensues, the device is turned on at a differential time. As will be explained subsequently (section 8), only one machine cycle is required and the screen of pentode 69b (Et) is at high potential during the complete cycle. Accordingly, a reduction in the negative control grid bias of pentode 69b causes trigger Et to be turned on, in a manner now understood.

Assuming it is desired to select —3— as the digit whose value is to be represented by three discrete electrical pulses. The manner in which trigger Et is turned on at time "3" is as follows:

Referring to Fig. 5g, a "3" digit representing pulse is produced by the commutator on resistor 104h (section 5) and is effective via one of the lines 105, digit key controlled contacts 117t3, closed upon depression of the No. 3 digit key, in a manner described in said parent application, and line 118t (see also Figs. 5e, 5b and 5c) to reduce the grid bias of pentode 69b (Et) thereby turning on trigger Et at "3" time.

With trigger Et "on," its point 66b rises in potential. This rise is applied to the screen of a gate tube 119a which is connected to the midpoint of resistor 63b (Et) through screen current limiting resistor 74. With the screen of gate tube 119a at high potential, changes in the grid bias of this gate are now effective to vary current flow therethrough.

Referring to Fig. 5a, it is recalled that b-phased pulses are produced on resistor 98b (section 4).

Line 120 extends from the grid of gate 119a (Fig. 5c) (see also Fig. 5b) to 98b (Fig. 5a) so that the grid of gate 119a has b-phased impulses continuously impressed upon it, as long as the machine is in operation. Normally, this gate remains closed and these b pulses are ineffective. However, when, as explained above, the screen voltage of gate 119a (Fig. 5c) is raised at "3" time, the positive and negative b-phased pulses are now effective to increase and decrease, respectively, the voltage drop across load resistor 121. Accordingly, condenser 122, discharges and charges, respectively, and a-phased negative pulses are produced on resistance 123.

The manner in which a "0" time pulse is produced on resistance 113 (Fig. 5g) has been explained (section 5), and this pulse is effective once each machine cycle via line 114 (see also Figs. 5e, 5b and 5c) to reduce the negative grid bias of triode 116a (Et) thereby shutting off trigger Et with an accompanying potential drop of its point 66b (Et) at "0" time. Accordingly, the screen voltage of gate 119a (Fig. 5c) falls, and the b-phased pulses continuously applied to its control grid are no longer effective to produce changes of current flow therein, and a-phased negative pulses no longer appear on resistance 123 after "0."

Consideration of the foregoing indicates that when digit —3— is selected, trigger Et (Fig. 5c) is "on" for three index point positions. During the time interval that trigger Et is "on," the screen of gate 119a is raised in potential so that b-phased pulses which are continuously applied to its control grid, during said interval, produce current variations therethrough. These current variations appear as a-phased negative pulses on resistance 123. The number of a-phased negative peaks which appear on resistance 123 (Fig. 5c) is equal to the number of index point positions during which trigger Et is "on," which in this particular example, is three.

Resistance 123 referred to above is connected to line 51, as is also the cathode of triode 119b. Since the grid of 119b is connected to resistance 123, its normal bias is zero and there is substantially full flow through 119b so that a positive pulse, appearing on resistance 123 has no appreciable effect on current flow through triode 119b.

Since the grid of triode 119b draws current when a positive pulse is applied to resistance 123, such pulse is attenuated by the resultant current flow through 123 and therefore is almost completely lopped off. A negative pulse on 123, however, increases the negative bias on the grid of triode 119b, reducing current flow therethrough and the voltage drop across resistance 124. Condenser 125 is charged and a b-phased positive pulse appears on resistance 72b. The number of such positive pulses which are produced on resistance 72b (Fig. 5c) is equal to the number of negative pulses appearing on resistance 123 because of this circuit arrangement. Hence, with a selection of digit —3—, only three negative pulses occur on resistance 123, as described above, and therefore only three positive pulses are produced on resistance 72b. Pulses on resistance 72b are applied to line 75 (Fig. 5c) for the purpose of sequentially turning on or advancing the digit manifesting elements of the accumulator of said parent application. It is to be noted, however, that these digit representing advancing pulses, are b-phased, in contradistinction to the a-phased advancing pulses used in the commutator.

In this section the production of digit representing advancing pulses has been generally explained and it has been pointed out that the number of such pulses produced, during adding, equals the value of an entered digit. This illustrates the manner in which the operation of a trigger control device is initiated on a differentially timed basis, under control of electrical manifestations representative of a digit to be selected, and also illustrates that the trigger and gate tube remain operative for a number of index point positions equal to the entered digit, and that their operation is terminated at a fixed time. It has also been shown that, as a result of such operation, discrete pulses are created equaling the number of index point positions during which the device is operative and thus equalling the number represented by the digit selected.

7. Complemental number pulse production

When the accumulator of said parent application is to subtract, operation of the trigger control device begins at a fixed time in the cycle instead of a selected time, as in adding. This operation continues until that index point position is reached which position corresponds numerically to the subtrahend, at which differential time, suspension of this operation occurs. This is production of a nines complement, which is the method employed for subtraction in said parent application. If, for example, a —6— is the digit selected as the subtrahend, the trigger control element is started in operation at a fixed time and is stopped under control of a "6" time pulse, representative of the digit —6— selected for subtraction, as described presently, a series of three pulses (the nines complement of —6—) will be permitted to pass by the gate tube 119a (Fig. 5c).

Referring now to Fig. 5c, the trigger control device Eu for the units order of the accumulator of said parent application is similar to trigger Et (section 6) and it is therefore not believed necessary to describe trigger Eu in detail. The operation of the units order trigger will be described, as it more clearly depicts operation, during subtraction. Normally trigger Eu is "off", and when a "½ after D" time pulse is effective via line 147 (as described in sec. 8), early in a subtraction cycle, the trigger is turned on. As will be explained subsequently, (section 8) during a single subtractive entry, only one machine cycle elapses and further the screen of pentode 69b (Eu) is at a low potential during the complete cycle so that 69b is not operative, as it is in adding. As will also be explained later (section 8) the screens of pentodes 139a and 140a (Fig. 5e) are at a high potential during the complete cycle. The manner in and time at which trigger Eu is turned on will now be described.

Referring to Fig. 5g, a "½ after D" pulse is produced on resistor 104p (section 5) and is effective via line 109 (see also Fig. 5e) to reduce the negative grid bias of pentode 140a. Since, as stated above, the screen potential of 140a is high, this grid bias reduction increases current flow through 140a and the voltage drop across load resistor 141. Condenser 142 discharges and a negative pulse is produced on resistance 143. The grid of triode 140b is connected to resistance 143 and the negative pulse on the latter increases the negative grid bias of triode 140b, reducing current flow through the tube and the voltage drop across load resistor 144. Condenser 145 is charged and a positive pulse is produced on resistor 146. This positive "½ after D" pulse is effective via line 147 (see also Figs. 5b and 5c) to reduce the negative grid bias of triode 116b (Eu) (Fig. 5c) thereby turning on trigger Eu. With Eu "on", its point 66b rises in potential at "½ after D." This rise is applied to the screen of gate 119a (Fig. 5c). The manner in which a rise in the screen potential of gate 119a eventually produces digit representing pulses on resistor 72b is as described previously (section 6). The production of these digit representing pulses is initiated at a fixed time for subtractive purposes and is stopped at differential times in accordance with the digit selected for subtraction.

The reason for turning on trigger Eu at "½ after D," rather than at "9" as might be expected, will be clear after considering the following: At the beginning of a subtraction cycle, trigger Eu is "off", and it was shown in connection with the trigger circuit (section 2, Figs. 1 and 2) that a pulse, applied concurrently to both portions of said trigger, shifts it to a reverse status. Consequently, if it be supposed that —9— were the digit selected to be subtracted and a subtraction control "9" pulse (instead of a "½ after D" pulse) were to be applied to triode 116b (Eu) (Fig. 5c) and also a digit manifesting "9" pulse were to be concurrently applied to triode 115a (Eu), (to which subtractive digit time pulses are applied, see later), Eu would shift to an "on" status and remain so until "0." It is required, however, when —9— is to be subtracted, that trigger Eu remain "off." Hence, were the control for Eu, as just supposed, digit representing pulses would be produced when none is required, since for nine's complement of —9— is —0—. Therefore, in subtracting nine, trigger Eu must be allowed to turn on but without allowing any digit representing pulses to be produced and must be turned off at "9." This condition is fulfilled by causing trigger Eu to turn on at "½ after D" so that it will be turned off by the "9" pulse.

Point 66b of trigger Eu begins to rise in potential at "½ after D." Even though there is an accompanying rise in the screen voltage of gate 119a, no pulse appears on resistance 72b for the following reason. The aforementioned rise of point 66b (Eu) is not instantaneous, but occurs exponentially. Therefore, there is a lapse of time before point 66b (Eu) reaches its maximum high potential, and the same applies also to the screen voltage rise of gate 119a. This time interval exceeds the duration of a pulse, which is applied to the grid of gate 119a (Fig. 5c). Hence, the pulse, applied at "½ after D" ceases to exist by the time that the screen of gate 119a reaches its maximum voltage. Under these circumstances, gate 119a experiences concurrently an increase of negative grid bias (because the amplitude of the pulse applied is decreased from its positive peak value) and an increase of screen voltage, which two conditions oppose each other, so that there is no current flow through the gate. Accordingly, no negative and positive pulses are produced at "½ after D," on resistances 123, and 72b, respectively.

Assuming, as stated above, that it is desired to subtract a —6—. Trigger Eu is turned on at "½ after D" as described above. A "6" time digit manifesting pulse, produced on resistor 104e, (Fig. 5g) (section 5), is effective via one of the lines of group 105, key controlled contacts 117u6, now closed and line 118u (see also Figs. 5e, 5b and 5c) to reduce the negative grid bias of triode 115a thereby turning off trigger Eu at "6," with an accompanying potential drop of its point 66b (Eu). Accordingly, the screen voltage of gate 119a (Fig. 5c) falls and digit representing pulses are no longer produced on resistance 72b. Consideration of the foregoing indicates that when a digit of —6— is selected to be subtracted, Eu (Fig. 5c) is "on" for three index point positions. During this interval, the number of pulses produced on resistance 72b is not only equal to the number of index point positions, namely three, during which Eu is "on," but it is to be noted that this number is equal to the nine's complemental value of the subtrahend, which in this case is —6—. Thus the nines complement of a selected digit is represented by a series of discrete electrical manifestations equal in number to the nines complement of the selected digit.

In order that a true difference amount may be formed, the true complement of —6—, namely —4—, should be added in the units order. As is understood when employing complemental addition as a method of subtracting, it is necessary to add an elusive one, into the units order of an accumulator. In the electronic accumulator of the parent application, provision is made for adding the elusive one and this operation takes place at the "11" time in a cycle. The manner in which an elusive one pulse is produced will now be described.

Referring to Fig. 5g, an "11" pulse, produced on resistor 104L (section 5), is effective via line 108 (see also Fig. 5e) to reduce the negative grid bias of pentode 139a. Since the screen voltage of pentode 139a during subtraction is high (sec. 8) the reduction of its negative grid bias causes an increase of current flow therethrough and an increased voltage drop across load resistance 147a. Condenser 148 discharges and a negative pulse is produced on resistance 149. The grid of triode 139b is connected to resistance 149 and the negative pulse thereon is effective to decrease current flow through 139b and the voltage drop across load resistance 150. Condenser 151 is charged and a positive pulse is produced on resistance 152. This "11" pulse is effective via line 153 (Figs. 5b, 5c) to reduce the negative grid bias of triode 115b, thereby turning on trigger Eu. With Eu "on," its point 66b rises in potential at "11," as does also the screen of gate 119a (Fig. 5c). Eu remains in an "on" status until "12" at which time it is turned off by a "12" pulse applied via line 114 to the grid of triode 116a in a manner described in said parent application. With Eu functioning in this manner, a single pulse only, is produced on resistance 72b representative of the elusive one. This pulse in conjunction with the three pulses originally produced, as described above, is equal to four pulses or in other words the tens complement of the digit —6— selected for subtraction.

8. *Operation for multiple digit pulse production*

Let it be assumed that a multidenominational amount of —159— is to be additively entered into an accumulator such as disclosed in said parent application. The operator, therefore, depresses the No. 1, No. 5 and No. 9 keys in the hundreds, tens and units orders, respectively, of the keyboard of the accumulator of said parent application causing closure of contacts 117h1, 117t5 and 117u9 (Fig. 5g). The closure of these contacts permits digit manifesting pulses "1," "5" and "9" to initiate operations of the trigger control devices in the respective orders of the accumulator upon depression of a motor bar to move contact 181 m. b. (Fig. 5b), as described presently. It is appreciated that the operator desires to enter the amount of —159—, only once, and mention has been made heretofore that a single entry control device is provided for this purpose. The manner in which this device functions is as follows.

In general, when operation of the single entry control device is initiated by the operator's depression of the motor bar, such depression may occur at any time within a machine cycle, as defined by operation of the electronic commutator (Figs. 5a, 5d and 5f). In its operation, the single entry control device coordinates a manual operation, which may possibly occur at any time, with the basic timing of the electronic commutator, so that this manual operation does not have to be critically timed with respect to any cyclical operation. In addition, the single entry control device is so arranged that its control over digit representing pulses is exercised, for one machine cycle only. Thus, for each depression of the motor bar, pulses, represenative of each digit, of the amount set up on the keyboard, are produced concurrently, but once only.

Referring to Fig. 5b, the single entry control device comprises two trigger elements, of the type described previously (section 2, Figs. 1 and 2). These two elements are designated T1 and T2 and portions of their circuits which correspond in character and function to those of the circuits illustrated in Figs. 1 and 2 are given the same reference characters. The details of the operation of this device is as follows, assuming that both T1 and T2 are initially "off."

In Fig. 5b, a voltage divider comprising resistors 192 and 193 is provided between lines 50 and 51. The central blade 181 m. b. of a contact assembly controlled by the motor bar is normally positioned as shown in Fig. 5b and connects the junction point of these resistors to one side of condenser 194 whose other side is connected to line 51. With this central blade 181 m. b. in the position shown, (Fig. 5b) condenser 194 is charged to the potential across resistor 193. Upon depression of the motor bar this central blade 181 m. b. shifts to the reverse position from that shown and the charge on condenser 194 is completely dissipated in the form of a sharp pulse on resistor 195. Another pulse cannot be produced on 195 until condenser 194 is again charged and this does not occur until central blade 181 m. b. is returned to the position as shown, (Fig. 5b), upon release of the motor bar. Hence, for each depression of the motor bar, one pulse and one only is produced on resistance 195 (Fig. 5b). Maintained depression of the motor bar merely serves to maintain condenser 194 in discharged condition and therefore no additional pulse or pulses appear on 195.

The grid of triode 196 (T1) is connected to resistor 195 so that when the pulse appears on 195, trigger T1 is turned on, as is now well understood, and its point 66b rises in potential.

The screen of pentode 69b (T2) is connected via screen current limiting resistor 74 to the midpoint of resistance 63b (T1), and, with T1 "on," the screen potential of pentode 69b (T2) is raised, so that a reduction in its negative grid bias will be effective to turn on trigger T2.

The manner in which a pulse is produced at "D," which is the same as "12," on resistor 104a (Fig. 5g) was explained in section 5, and such pulse is effective via line 106 (see also Figs. 5e and 5b) to reduce, concurrently, the negative grid bias of pentodes 69a and 69b (T2). Since T2 is "off," and as stated above the screen potential of its tube 69b is now high, this negative grid bias reduction at "D" causes trigger T2 to be turned on. With T2 "on," its point 66b rises in voltage at "D."

Summing up, it is seen from the foregoing that whenever the operator depresses the motor bar, shifting center blade 181 m. b. (Fig. 5b) to the reverse position from that shown, trigger T1 is turned on and this turning on may occur at any time in a machine cycle. It is also seen that when T1 is "on," it permits trigger T2 to be shifted to an "on" status at a definite time, only, in a machine cycle, namely, "12" (or "D") which, as is now understood, marks the beginning of a machine cycle. As is explained later in this section, T2 remains "on" for one machine cycle only.

The screens of pentodes 69b of Eu (Fig. 5c), Et and Eh are each connected to line 196, which, through switch 191a (Fig. 5b), maintained in the position as shown, for adding, connects to line 197 which extends via screen current limiting resistor 74 to the midpoint of resistance 63b (T2). With T2 "on," which occurs at the beginning of a cycle, the screen potential of these pentodes 69b is high and negative grid bias reductions thereof are effective to turn on Eu (Fig. 5c), Et and Eh. Such reductions occur at differential times in accordance with the digit manifesting pulses applied to the respective grids, via lines 118u, 118t and 118h, as previously described for 118t (section 6). Since an amount of —159— is to be entered, Eh, Et and Eu are turned on at "1," "5" and "9," respectively, so that nine digit representing pulses will appear on resistance 72b (Fig. 5c) of the units order trigger control Eu, five digit representing pulses will appear on resistance 72b of the tens order trigger control Et and a single digit representing pulse will appear on resistance 72b of the hundreds order trigger control Eh, Eu, Et and Eh being turned off at "0" via lines 114 and triodes 116a, respectively, as described above in sec. 6.

The turning on of triggers T1 and T2 was described above in this section. With T2 (Fig. 5b) "on," T1 may now be turned off, since it has performed one of its functions, namely, causing T2 to be turned on. T2, when in "on" status, is utilized to control the shift of T1 to an "off" condition, as will now be described. The screen of pentode 69a (T1) is connected to line 197, so that its potential is high when T2 is "on." During the cycle in which the multidenominational number —159— is entered, therefore, the screen voltage of pentode 69a (T1) remains high so that a negative bias reduction of its grid will turn off T1. The production of a pulse at "0" on resistance 104k (Fig. 5g) has been described (section 5), and said pulse is effective via line 107 (see also Figs. 5e and 5b) to reduce the negative grid bias of pentode 69a (T1) so that trigger T1 is turned off.

As explained above, the function of trigger T2 (Fig. 5b) is to permit only a single entry of the amount —159—. It follows, therefore, that trigger T2 must not remain "on" longer than one machine cycle. The shift of T2 back to an "off" condition is the second function of T1. This may be performed by T1, only when it is "off," to which status it was returned at "0," as just described. With T1 now "off," its point 66a is at a high potential with respect to line 51 and the screen of pentode 69a (T2) which is connected via screen current limiting resistor 74b to the midpoint of resistance 63a (T1), is, therefore, also high. A reduction in the negative grid bias of pentode 69a is therefore effective to turn off trigger T2. The grid of pentode 69a (T2) is connected to line 106, to which is applied a pulse at "12," as previously described, so that this pulse, which occurs at the termination of that machine cycle in which —159— is entered, turns off T2. Since the screen potential of pentodes 69b (Eu, Et and Eh) also drop, further applications to their respective grids (in following machine cycles) of digit manifesting pulses "9," "5" and "1," do not cause triggers Eu, Et and Eh to be turned on. Hence, no further entries of —159— occur.

In order to subtract, the operator throws a toggle switch thus shifting blades 191a (Fig. 5b) and 191b (Fig. 5e) to a reverse position from that shown. With blade 191a shifted, line 196 is connected to line 61, and with blade 191b shifted, the screens of pentodes 139a and 140a are connected to line 197, which is connected through screen current limiting resistor 74 (Fig. 5b) to the midpoint of resistance 63b (T2). With this circuit arrangement, during subtraction, the screen voltage of pentodes 139a and 140a is determined by the status of T2 and it is recalled that T2 is "on" during a single complete machine cycle. Accordingly, the screen potential of pentodes 139a and 140a is high during a single full subtraction cycle and reductions in negative grid bias of these tubes are effective to increase current flow through them.

Assuming now that a multidenominational amount of —203— is to be subtractively entered into an accumulator, the operator depresses the No. 2, No. 0 and No. 3 keys in the hundreds, tens and units orders, respectively, of the keyboard of said parent application, producing closure of contacts 117h2, 117t0, and 117u3 (Fig. 5g). The closure of the former and latter contacts permits, upon depression of the motor bar the digit representing pulses "2" and "3" to terminate operations of the trigger control devices in the respective orders of the accumulator, while the closure of contacts 117t0 connects line 118t to line 51.

Upon the operator's depression of the motor bar center blade 181 m. b. (Fig. 5b) shifts to a reverse position from that shown, and the charge on condenser 194 is completely dissipated across resistor 195, as now understood. The resultant pulse turns on trigger T1 with an accompanying rise in potential of its point 66b. By the control afforded by the "on" status of T1 (Fig. 5b), T2 is turned on at "12," as previously described. With T2 "on," the screen potential of pentode 140a (Fig. 5e) is high (via line 197) so that a "½ after D" pulse, applied to its grid via line 199, results via condenser 142, resistor 143, triode 140b and condenser 145 in the production of a positive pulse on resistance 146. This pulse is effective via line 147 (Figs. 5e, 5b and 5c) to concurrently turn on triggers Eu, Et and Eh at "½ after D." The production of complemental number pulses is initiated at the chosen fixed time and stopped at differential times, as described previously.

In the units order, —3— is to be subtracted, and at "3," accordingly, Eu (Fig. 5c) is shifted to an "off" status. During the six index point positions that Eu is "on," six pulses are produced.

In the tens order, —0— is to be subtracted, and at "0," therefore, Et (Fig. 5c) is turned off, in the normal manner. No "0" digit representing pulse is applied to line 118t (Figs. 5g, 5e, 5b and 5c) since contacts 117t0 (Fig. 5g) are closed to connect said line to line 51. During the nine index point positions that trigger Et (Fig. 5c) is "on," nine advancing pulses are produced.

In the hundreds order, —2— is to be subtracted, and at "2," accordingly, Eh (Fig. 5c) is shifted to an "off" status. During the seven index point positions that Eh is "on," seven pulses are produced.

With T2 (Fig. 5b) "on," the screen potential of pentode 139a (Fig. 5e) is high and an "11" pulse applied to its grid via line 108 results in the production of a positive pulse on resistance 152 in a manner as previously described. This pulse is effective via line 153 (Figs. 5e, 5b and 5c) to turn on units trigger Eu at "11." Eu remains "on" until "12" and as a result of this operation a pulse representative of an elusive one is produced in the units order.

During the cycle in which —203— is subtractively entered, T1 (Fig. 5b) is turned off at "0" under the control of T2, followed by a shift of T2 to an "off" status at "12" under the control of T1, in a manner now understood. Since the screen potential of tubes 140a and 139a (Fig. 5e) also drops when T2 is "off," further applications of "½ after D" and "11" controlling pulses (during subsequent machine cycles) to the grids thereof are ineffective to cause either turning on of the entry control devices or an application of the elusive one to the units order. Hence, further subtractive entries of —203— cannot occur. As is seen from the above, a series of discrete pulses equal in number to the tens complement of —3— is produced by Eu, a number of pulses representative of the nines comlement of —0— is produced by Et and a number of pulses representative of the nines complement of —2— is produced by Eh.

In connection with the above explanation of subtracting operations, it is shown that pentode 140a and triode 140b permit a "½ after D" pulse to effect turning on of all trigger control devices and that pentode 139a and triode 139b permit an "11" pulse to produce the elusive one. It has also been shown that pentodes 140a and 139a are conjointly controlled by T2 of the single entry control device. It is therefore seen, that during subtraction, the single entry control device not only performs its regular function of permitting a single entry only, to be made into the accumulator, but it also determines that such entry is to be made subtractively and, accordingly, performs the additional function of a subtraction control device.

9. Conditioning—electronic commutator

As will be explained in the latter portion of this section, it is necessary, prior to operation of the device of the present invention, to condition the electronic commutator. This operation is performed in two steps: the first turns off any of the commutator trigger elements C9 (Fig. 5a), C8, etc., (Figs. 5d and 5f) which are "on," and the second turns on the trigger C12, (Fig. 5a), which is arbitrarily chosen for this purpose.

It was stated in section 5 that b-phased pulses are produced (in some manner) on resistance 72a2 (Fig. 5b) and it was seen that they are effective via line 76 (see also Figs. 5a, 5d and 5f) to restore any of the triggers C9, C8, etc. . . . C11 which are "on," to an "off" status, when a following element is turned on, during the sequential operation of the commutator. Before proceeding to the description of the electronic commutator conditioning, the details of the circuits by which b-phased pulses are produced on resistance 72a2 (Fig. 5b) will be described.

Line 90 (to which a-phased pulses are applied, section 4) is connected to the No. 1 grid of pentagrid mixer tube 267 (Fig. 5b). The No. 2 and No. 4 grids of 267 are internally joined and externally connected to the junction of resistances 268 and 269, which together form a voltage divider between lines 50 and 51. Condenser 270 (Fig. 5b) aids this voltage divider in maintaining constant, the potential of the No. 2 and No. 4 grids of tube 267, for current variations therethrough. Grid No. 3 of tube 267 connects to a point on resistance 271, which is coupled by condenser 272 and line 273, to the anode of amplifier tube 92a (Fig. 5a). The manner in which tube 92a controls production of a-phased pulses on resistance 271 (Fig. 5b) is exactly similar to its action in producing such pulses on resistance 72b (Fig. 5a), as explained previously (section 4). The point on resistance 271 to which the No. 3 grid of tube 267 is connected is normally maintained at the potential of line 80, since switch 274 (Fig. 5b) is normally closed, as shown. Therefore, the No. 3 grid of tube 267, is maintained at the potential of line 80 and a-phased pulses appearing on the non-shunted portion of resistance 271 have no effect on the bias of this grid. The anode of tube 267 is connected to line 50 through load resistance 275, and is coupled to resistance 72a2 through condenser 276. As is now understood, either the No. 1 grid or the No. 3 grid or both together may control the amount of plate current handled by the tube 267. In the normal arrangement of tube 267, as set forth above, the bias of the No. 3 grid is maintained constant while a-phased pulses continually vary the bias of the No. 1 grid. Resulting current flow variations through the tube and through resistance 275 produce the b-phased pulses on resistance 72a2. The amplitude of the pulses appearing on this resistance is ample for the electronic commutator element control purposes, referred to in section 5.

To operatively condition the electronic commutator, the operator throws switch 274 (Fig. 5b) to the reverse position from that shown. The a-phased pulses on resistance 271 are now effective to reduce the negative bias of the No. 3 grid of tube 267 and, as stated above, the a-phased pulses, applied to line 90, are also effective, to reduce the negative bias of the No. 1 grid of tube 267. With switch 274 open, a-phased pulses are therefore concurrently applied to the No. 1 and No. 3 grids of tube 267, and cause an effective negative bias reduction which is greater in magnitude than that caused by the No. 1 grid alone. Accordingly, the current flow through tube 267 is greater than normal. The resulting voltage drops across resistance 275 are increased in magnitude as is also the amplitude of the b-phased pulses produced on resistance 72a2, or in other words, with switch 274 in open position, the amplitude of the pulses appearing on resistance 72a2 is greater than that of the pulses normally appearing thereon. These b-phased pulses, of increased magnitude, are applied to line 76 (see also Figs. 5a, 5d and 5f) to restore any of the triggers C9, C8 . . . etc. C11 which are "on," to an "off" status, as will now be explained.

Let it be assumed that trigger C8 (Fig. 5d) is the sole one "on." Even though the screen potential of pentode 69a (C8) is low, (C7 is "off") the b-phased pulses of increased amplitude now appearing on line 76 produce a greater than normal negative grid bias reduction on this tube 69a, increasing current flow therethrough sufficiently to turn C8 from an "on" to an "off" status. It is understood that the first of the b-phased pulses of increased amplitude appearing on line 76 is effective to accomplish this result. Succeeding similar pulses appearing on line 76 have no further effect and they merely continue until switch 274 (Fig. 5b) is returned to the position, as shown.

Having thrown switch 274 (Fig. 5b) first to the reverse position from that shown and then having returned it to the position, as illustrated, the operator has turned off any of the triggers C9, C8 . . . etc., C11 of the electronic commutator which are "on." To complete the conditioning of the commutator, the operator manipulates switch 281 (Fig. 5b) which turns trigger C12 to an "on" status, in a manner now to be explained, provided such element is not already "on."

Referring to Fig. 5b, line 93 (to which b-phased pulses are applied, section 4) is connected to the grid of pentode 278. The screen of this tube is connected to the junction of resistances 279 and 280, which together form a voltage divider between lines 50 and 51. The screen potential of pentode 278 is normally maintained at that of line 51, since switch 281 is normally closed, as shown, so that bias reductions of its grid have no effect on current flow therethrough. The anode of tube 278 is connected to line 50 through the load resistance 282, which is coupled to resistance 283 by condenser 284. Any positive potential on resistance 283 is effective to cause a negative grid bias reduction of triode 285. The anode of triode 285 is connected, via line 286, to point 66a (C12) (Fig. 5a).

To complete the commutator conditioning operation, the operator throws switch 281 (Fig. 5b) to the reverse position from that shown, thus removing the shunt from resistance 280 and producing an increase in the screen potential of pentode 278. Grid bias reductions of pentode 278, controlled by b-phased pulses appearing on line 93, cause increased current flow through the tube and its load resistance 282, with the result that a-phased pulses appear on resistance 283. The first positive pulse, appearing on resistance 283, is effective to reduce the negative grid bias of triode 285, increasing current flow therethrough and producing a voltage drop across resistance 62a (Fig. 5a) which brings about a shift of trigger C12 (Fig. 5a) from an "off" to an "on" status. It is appreciated that the first of the a-phased pulses applied to triode 285 (Fig. 5b) is effective to accomplish this result. Succeeding similar pulses applied to this triode have no further effect and they merely continue to appear until switch 281 (Fig. 5b) is returned by the operator to the position, as shown.

The foregoing has described the method employed for conditioning the electronic commutator of this invention, so that all, save a particular one of its trigger elements are placed in an "off" status, and it is seen that the operation is effected without regard to cyclical machine timing, and that the time required for a conditioning operation is independent of the number of elements which may be "on" or of their numerical designation.

When starting up the machine for normal operation by closing the main power switch 79 (Fig. 5a) to apply potential to lines 50, 61, etc., the status assumed by many of the trigger elements, such as C12, C9, etc., T1 (Fig. 5b), T2, Eu (Fig. 5c) etc., may be either an "on" or an "off" status and is governed solely by chance.

The operator therefore, proceeds to operatively condition the electronic commutator, as explained in this section, and then places it in operation by opening switch 101 (Fig. 5a). Thereupon, the commutator produces pulses, as described (section 5), and the control pulses "0" and "12" are effective to shift T1 (Fig. 5b), T2, Eu (Fig. 5c), Et and Eh to their normal "off" status, as is now understood. The above mentioned occasion for conditioning the electronic commutator is the only conditioning required when operating the machine.

In summary, there is provided a novel electronic, selective number pulse producer which comprises, in combination, a multivibrator for producing a continuous series of actuating pulses, an electronic commutator for producing, at high speed, a group of timed pulses, a keyboard for selecting a particular digit to be represented by a number of pulses equal to the digit which keyboard applies a particular one out of said groups of timed pulses to a gate tube, to thus selectively let through said gate, a number of pulses from said multivibrator source which number is determined by the particular digit key selected, the same multivibrator and the same commutator being employed for selectively producing from this single source of actuating pulses, completely separate pluralities of pulses in different orders of the device, each plurality representative of the individual digits, which taken together comprise a plural order number.

Novel means are therefore provided for electronically producing discrete electrical pulses representative of a selected digit as well as novel means for electronically producing discrete electrical pulses, equal in number to the nines complement or to the tens complement of a selected digit and these digits may respectively comprise individual digits of a multidenominational number to be additively or subtractively employed in a computing device.

While there have been shown and described and pointed out the fundamental novel features of the invention as applied to a single embodiment it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A multidenominational, selective number, pulse producer including a common source of pulses comprising a plurality of electronic emitting tube elements, operative to produce a number of pulses, means selectively applying timed manifestations in different orders of said multidenominational pulse producer and plural order, selectively operable means including said means selectively applying timed manifestations for rendering different ones of said common source pulses effective, concurrently in different orders, to represent different digits, each such digit comprising one of the digits of a multidenominational number.

2. A selective number, pulse producer comprising a source of oscillations, a gate tube for selectively rendering effective a selected number of said oscillations, means for rendering said gate tube operative at an invariable time and means comprising an electronic control element, selectively operated in accordance with a chosen digit operator, for rendering said gate tube inoperative at a differential time to selectively render effective a number of pulses representative of the nines complement of the chosen digit.

3. A selective number, pulse producer comprising a source of oscillations, a gate tube for selectively rendering effective a selected number of said oscillations, means for rendering said gate tube operative at an invariable time means comprising an electronic control element, selectively operated in accordance with a chosen digit operator, for rendering said gate tube inoperative at a differential time and means for rendering said gate tube invariably operative for a predetermined time subsequent to said differential time operation to thus selectively render effective a number of pulses, representative of the tens complement of the chosen digit.

4. A selective number, pulse producer comprising a source of electrical oscillations, a first electronic means for rendering said oscillations effective to produce a selected number of electrical pulses, electronic timing means for rendering said first electronic means operative at an invariable time, and selectively operable digit selecting means rendering said first electronic means inoperative at a differential time, to thereby produce a number of pulses representative of the nines complement of a selected digit.

5. A selective number, pulse producer comprising a source of electrical oscillations, a first electronic means for rendering said oscillations effective to produce a selected number of electrical pulses, electronic timing means for rendering said first electronic means operative at an invariable time, selectively operable digit selecting means for rendering said first electronic means inoperative at a differential time, to thereby produce a number of pulses representative of the nines complement of a selected digit, and means for selectively rendering said first electronic means operative to produce a single additional pulse.

6. A selective, multidenominational number, pulse producer comprising a common plurality of electronic pulse producers, each, when operated, producing one pulse, means to invariably operate all of said producers in sequence whereby each producer is invariably operated once, and means including multi-digit number selecting operable means and a plurality of circuits, and selectively operable to render the output of said common pulse producers effective differently, in different circuits, whereby a selected number of pulses representative of each of the digits of said multi-digit number is effective in each of said different circuits to represent the different digits of a selected multi-digit number.

7. A selective number, pulse producer including an electronic commutator producing a sequential series of timed pulses, a source of oscillations, a gate tube to which said oscillations are applied and normally blocking said oscillations, an electronic trigger operable from an initial condition to another condition and rendering said gate tube effective to pass said oscillations during one only of said conditions, and digit selecting means, selectively rendering said timed pulses individually operative to control the time period of one of said conditions of said trigger whereby a number of oscillations is passed by said gate tube equal in number to the digit selected.

8. A selective number, pulse producer comprising a source of oscillations, a gate tube for selectively rendering effective a selected number of said oscillations, means for rendering said gate tube operative at a differential time including an electronic control element, selectively operated in accordance with a chosen digit operator, and means for rendering said gate inoperative at an invariable time, to selectively render effective a number of pulses representative of a selected digit.

9. A selective number, pulse producer including a source of pulses, a plurality of electron emitting tube elements operative to selectively render a number of said pulses effective, a source of timed manifestations, and means selectively operable to render effective one only of said timed manifestations and applying said selected timed manifestation to said tube elements to thus selectively render a number of said pulses effective proportional to the timed manifestation selected.

10. A selective number pulse producer comprising an oscillator, electronic discharge means connected to said oscillator and normally ineffective to pass the pulses applied thereto by said oscillator, means for selectively producing an electrical signal representative of a digit, means controlled by said signal for rendering said electronic discharge means effective to pass the pulses applied thereto and a common pulse generating means, driven by said oscillator for applying pulses of continuously maintained time separation to said controlled means and to said signal producing means.

ARTHUR H. DICKINSON.

REFERENCES CITED

The following references are of record in the file of this patent:

UNITED STATES PATENTS

| Number | Name | Date |
|---|---|---|
| 2,095,730 | Bellamy | Oct. 12, 1937 |
| 2,103,297 | Nelson | Dec. 28, 1937 |
| 2,252,457 | Cockerell | Apr. 12, 1941 |
| 2,272,070 | Reeves | Feb. 3, 1942 |
| 2,308,778 | Prince | Jan. 19, 1943 |
| 2,348,016 | Michel | May 2, 1944 |
| 2,398,771 | Compton | Apr. 23, 1946 |
| 2,403,852 | Desch | July 9, 1946 |
| 2,403,873 | Mumma | July 9, 1946 |
| 2,416,188 | McClellan | Feb. 18, 1947 |

FOREIGN PATENTS

| Number | Country | Date |
|---|---|---|
| 355,705 | Great Britain | Aug. 24, 1931 |

Certificate of Correction

Patent No. 2,514,036 — July 4, 1950

ARTHUR H. DICKINSON

It is hereby certified that error appears in the printed specification of the above numbered patent requiring correction as follows:

Column 29, line 60, for the word "electronic" read *electron*; and that the said Letters Patent should be read with this correction therein that the same may conform to the record of the case in the Patent Office.

Signed and sealed this 26th day of September, A. D. 1950.

[SEAL]

THOMAS F. MURPHY,
*Assistant Commissioner of Patents.*